US008352150B2

(12) United States Patent
Hijikata

(10) Patent No.: US 8,352,150 B2
(45) Date of Patent: Jan. 8, 2013

(54) ENGINE CONTROL APPARATUS

(75) Inventor: Kenji Hijikata, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 316 days.

(21) Appl. No.: 12/222,217

(22) Filed: Aug. 5, 2008

(65) Prior Publication Data

US 2008/0300768 A1 Dec. 4, 2008

Related U.S. Application Data

(63) Continuation-in-part of application No. 11/802,175, filed on May 21, 2007, now Pat. No. 7,487,033, and a continuation-in-part of application No. 11/783,265, filed on Apr. 6, 2007, now Pat. No. 7,424,361.

(30) Foreign Application Priority Data

Apr. 7, 2006 (JP) ................................ 2006-106146
May 19, 2006 (JP) ................................ 2006-140754
May 22, 2006 (JP) ................................ 2006-142138

(51) Int. Cl.
*G06F 19/00* (2011.01)
*G06G 7/70* (2006.01)

(52) U.S. Cl. ....................................................... 701/102

(58) Field of Classification Search .................. 701/102, 701/103, 104, 110, 115; 123/406.23; 180/65.21, 180/65.31
See application file for complete search history.

(56) References Cited

U.S. PATENT DOCUMENTS

| | | | | |
|---|---|---|---|---|
| 5,070,960 | A * | 12/1991 | Nobumoto et al. | 180/197 |
| 5,535,830 | A * | 7/1996 | Matsushita et al. | 172/7 |
| 6,381,531 | B1 * | 4/2002 | Schmidt | 701/73 |
| 6,757,606 | B1 * | 6/2004 | Gonring | 701/103 |
| 6,836,719 | B2 * | 12/2004 | Andersson et al. | 701/93 |
| 6,901,906 | B2 * | 6/2005 | Goto et al. | 123/299 |
| 6,999,869 | B1 * | 2/2006 | Gitlin et al. | 701/115 |
| 7,540,344 | B2 * | 6/2009 | Yamamoto et al. | 180/65.285 |
| 2007/0100536 | A1 * | 5/2007 | Withrow et al. | 701/104 |
| 2007/0247975 | A1 | 10/2007 | Masuda et al. | |
| 2007/0255462 | A1 * | 11/2007 | Masuda et al. | 701/1 |

(Continued)

FOREIGN PATENT DOCUMENTS

JP 5-65037 3/1993

(Continued)

OTHER PUBLICATIONS

Japanese Office Action dated Nov. 24, 2010.

(Continued)

*Primary Examiner* — Stephen K Cronin
*Assistant Examiner* — Sizo Vilakazi
(74) *Attorney, Agent, or Firm* — McGinn IP Law Group PLLC

(57) ABSTRACT

A storage unit provided in an engine control device stores three kinds of mode maps having different engine output characteristics. One of the mode maps is selected in accordance with the driving conditions, and a target torque is set by referring to the selected mode map using an engine speed and an accelerator opening-degree as parameters. A throttle opening-degree signal corresponding to the target torque is output to a throttle actuator, and an operation of opening or closing the throttle valve is performed in response to the throttle opening-degree signal.

18 Claims, 26 Drawing Sheets

U.S. PATENT DOCUMENTS

| | | | | |
|---|---|---|---|---|
| 2007/0276549 | A1* | 11/2007 | Hijikata | 701/1 |
| 2008/0015768 | A1* | 1/2008 | Masuda et al. | 701/99 |

FOREIGN PATENT DOCUMENTS

| | | | | |
|---|---|---|---|---|
| JP | 5-332236 | | | 12/1993 |
| JP | 2000-087772 | A | | 3/2000 |
| JP | 2000-161098 | | | 6/2000 |
| JP | 2003-211966 | | | 7/2003 |
| JP | 2003211996 | A | * | 7/2003 |
| JP | 2004-108342 | A | | 4/2004 |
| JP | 2004-196055 | A | | 7/2004 |
| JP | 2005-141999 | | | 6/2005 |
| JP | 2005-188384 | | | 7/2005 |
| JP | 2005188384 | A | * | 7/2005 |
| JP | 2005-249098 | A | | 9/2005 |
| JP | 2005-315171 | A | | 11/2005 |
| JP | 2005-335702 | A | | 12/2005 |
| JP | 2006-001531 | A | | 1/2006 |
| JP | 2006-063959 | A | | 3/2006 |
| JP | 2006-074931 | A | | 3/2006 |

OTHER PUBLICATIONS

Japanese Office Action dated May 24, 2011.
Japanese Office Action dated Aug. 30, 2011.
Japanese Office Action dated Oct. 18, 2011 with partial English translation.

* cited by examiner

FIG.8A Mp1
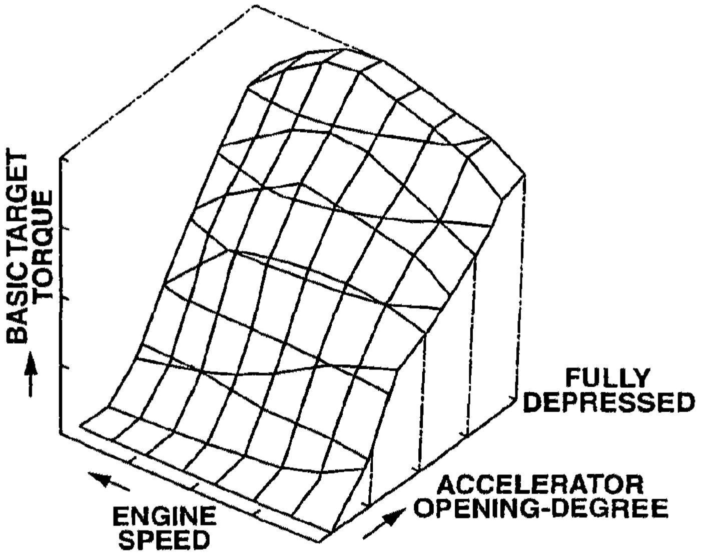
FIG.8B Mp2
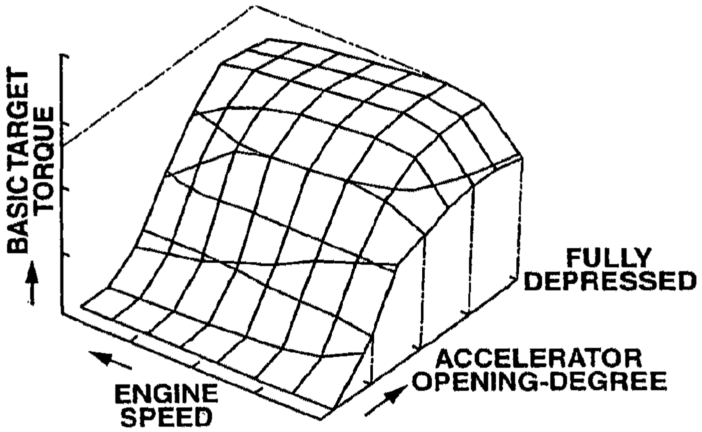
FIG.8C Mp3
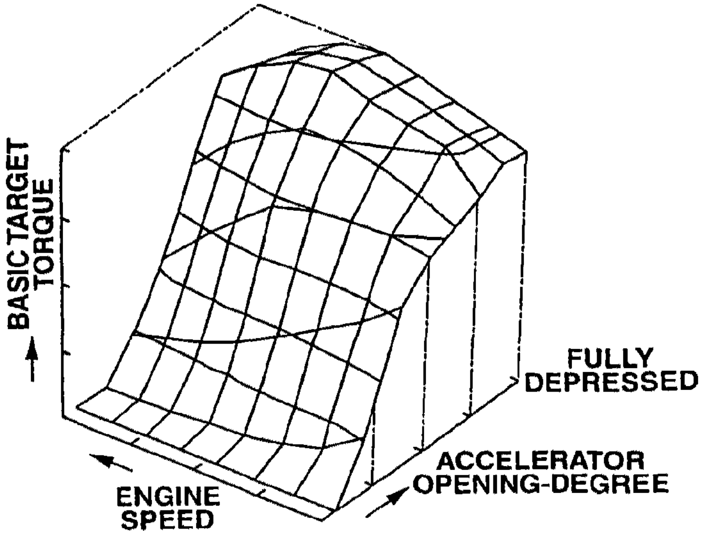

Mr1

Mr2

FIG.14A Mpθ1
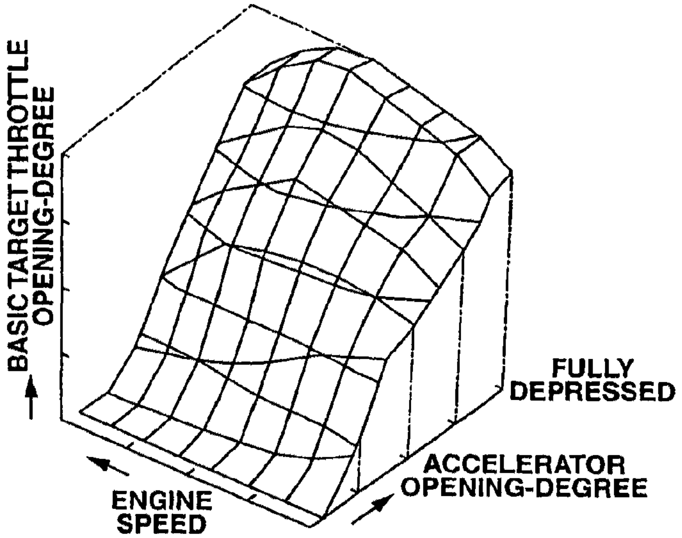
FIG.14B Mpθ2
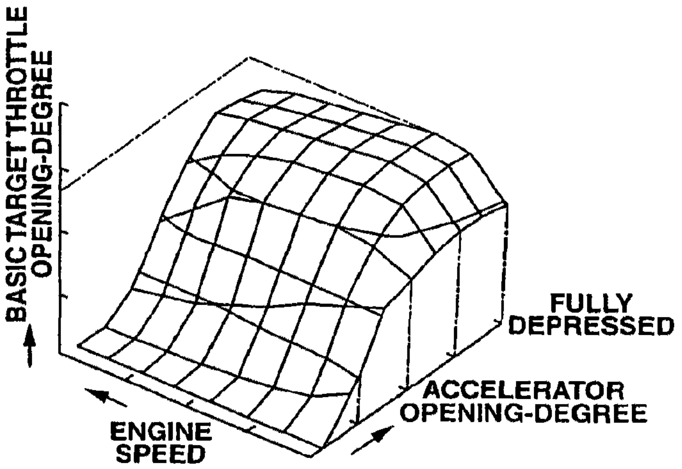
FIG.14C Mpθ3
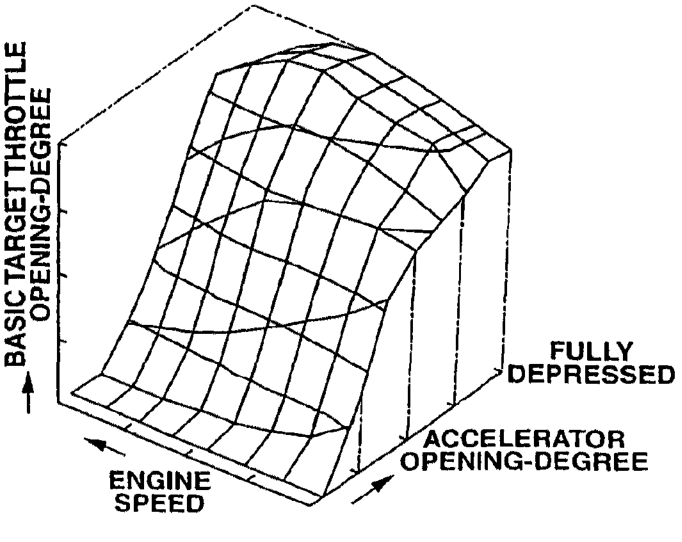

Mp1

Mp2

Mp3

ENGINE CONTROL APPARATUS

CROSS REFERENCE TO RELATED APPLICATIONS

This application is a continuation-in-part of U.S. application Ser. No. 11/802,175 filed on May 21, 2007 now U.S. Pat. No. 7,487,033 which claims benefit of Japanese Application No. 2006-142138 filed on May 22, 2006, and U.S. application Ser. No. 11/783,265 filed on Apr. 6, 2007 now U.S. Pat. No. 7,424,361 which claims benefit of Japanese Applications No. 2006-106146 filed on Apr. 7, 2006 and No. 2006-140754 filed on May 19, 2006, the entire contents of which are incorporated herein by their reference.

BACKGROUND OF THE INVENTION

1. Field of the Invention

The present invention relates to an engine control apparatus having engine control modes including at least a high output mode and an output restricted mode.

2. Description Related Art Statement

Generally, a vehicle such as an automobile preferably has both excellent fuel economy performance and driving performance (acceleration response), but it is hard to achieve a vehicle which is provided with both of them. Thus, a technology is known in which a plurality of control modes including a standard normal mode, an economy mode for reducing fuel consumption, and a power mode for increasing output are set so that a driver can select one of the control modes through an operation such as a switching to provide both of fuel economy performance and driving performance to a vehicle.

For example, Japanese Patent Application Laid-Open No. 5-332236 discloses a technology for selecting an air-fuel ratio map and an ignition timing map which correspond to a control mode (one of economy mode and power mode) selected by a driver so as to perform fuel injection control and ignition timing control based on the selected maps.

Japanese Patent Application Laid-Open No. 5-65037 discloses a technology for improving both fuel economy performance and driving performance (acceleration response) by setting the characteristics of opening-degrees of an electronic controlled throttle and characteristics of transmission of an automatic transmission for each control mode (economy mode and power mode) in association with each other, and performing the throttle opening-degree control and the transmission control in accordance with these characteristics.

However, in the above technologies disclosed in the documents, at a start of a vehicle, if a driver selects a control mode such as an economy mode in which an output is restricted to reduce fuel consumption, an engine of the vehicle is operated under a high load, so that a start of a vehicle on an upslope for example in an economy mode sometimes results in an insufficient torque, and an excellent starting performance cannot be attained.

On the other hand, if the driver selects a control mode such as a power mode for increasing output at the start of a vehicle, a slight depression of an accelerator pedal leads to a considerable change of a driving torque, so that a start of a vehicle on level ground for example in the power mode in which an engine of the vehicle is operated under a low load sometimes results in a shock of a sudden start for the driver due to a rapid acceleration.

As a result, at a start in a power-saved mode such as an economy mode selected by a driver, there is a range that the driver feels an insufficient torque, while at a start in a power mode, there is a range that the driver feels a shock of a sudden start due to an increased torque. In either mode at the start of a vehicle, an excellent driving performance cannot be attained.

SUMMARY OF THE INVENTION

One object of the present invention is to provide an engine control apparatus in a vehicle which one of a plurality of control modes can be selected, and achieves an excellent starting performance in any control mode without a feeling of excess or insufficient torque.

A first aspect of the present invention provides an engine control apparatus including driving-state detection means for detecting a driving state; storage means for storing mode maps for respective engine control modes, the engine control modes including at least a power mode having engine output characteristics that prioritize power and a save mode having engine output characteristics with which power is suppressed, each mode map having lattice axes of an accelerator opening-degree and the driving state and setting an engine output command value for the corresponding engine control mode; selecting means for selecting one of the engine control modes; and engine-output-command-value determining means for determining the engine output command value by referring to the mode map corresponding to the engine control mode selected by the selecting means.

A second aspect of the present invention provides an engine control apparatus including driving-state detection means for detecting a driving state; storage means for storing mode maps for respective engine control modes, the engine control modes including at least a normal mode having engine output characteristics suitable for normal driving and a power mode having engine output characteristics that prioritize power, each mode map having lattice axes of an accelerator opening-degree and the driving state and setting an engine output command value for the corresponding engine control mode; selecting means for selecting one of the engine control modes; and engine-output-command-value determining means for determining the engine output command value by referring to the mode map corresponding to the engine control mode selected by the selecting means.

A third aspect of the present invention provides an engine control apparatus including driving-state detection means for detecting a driving state; storage means for storing mode maps for respective engine control modes, the engine control modes including at least a normal mode having engine output characteristics suitable for normal driving and a save mode having engine output characteristics with which power is suppressed, each mode map having lattice axes of an accelerator opening-degree and the driving state and setting an engine output command value for the corresponding engine control mode; selecting means for selecting one of the engine control modes; and engine-output-command-value determining means for determining the engine output command value by referring to the mode map corresponding to the engine control mode selected by the selecting means.

A fourth aspect of the present invention provides an engine control apparatus including driving-state detection means for detecting a driving state; storage means for storing mode maps for respective engine control modes, the engine control modes including at least a normal mode having engine output characteristics suitable for normal driving, a save mode having engine output characteristics with which power is suppressed, and a power mode having engine output characteristics that prioritize power, each mode map having lattice axes of an accelerator opening-degree and the driving state and setting an engine output command value for the corresponding engine control mode; selecting means for selecting one of the engine control modes; and engine-output-command-value determining means for determining the engine output command value by referring to the mode map corresponding to the engine control mode selected by the selecting means.

In a fifth aspect of the present invention, according to the first to fourth aspects of the present invention, the selecting means may automatically select one of the engine control modes on the basis of the driving state detected by the driving-state detection means.

In a sixth aspect of the present invention, according to the first to fourth aspects of the present invention, the selecting means may automatically select one of the engine control modes on the basis of a vehicle speed and a weighted average of the sums of parameters corresponding to a plurality of events based on the driving state detected by the driving-state detection means.

According to the aspects of the present invention, provided is a vehicle which is capable of selecting one of a plurality of engine modes with different engine output characteristics and which achieves an excellent driving performance without a feeling of excess or insufficient torque.

BRIEF DESCRIPTION OF THE DRAWINGS

FIG. 8A is a conceptual diagram showing a normal mode map;

FIG. 8B is a conceptual diagram showing a save mode map;

FIG. 8C is a conceptual diagram showing a power mode map;

FIG. 14A is a conceptual diagram showing a normal mode map;

FIG. 14B is a conceptual diagram showing a save mode map;

FIG. 14C is a conceptual diagram showing a power mode map;

DETAILED DESCRIPTION OF THE PREFERRED EMBODIMENTS

First Embodiment

The first embodiment is explained with reference to FIG. 1 through FIG. 14.

Figure 1:
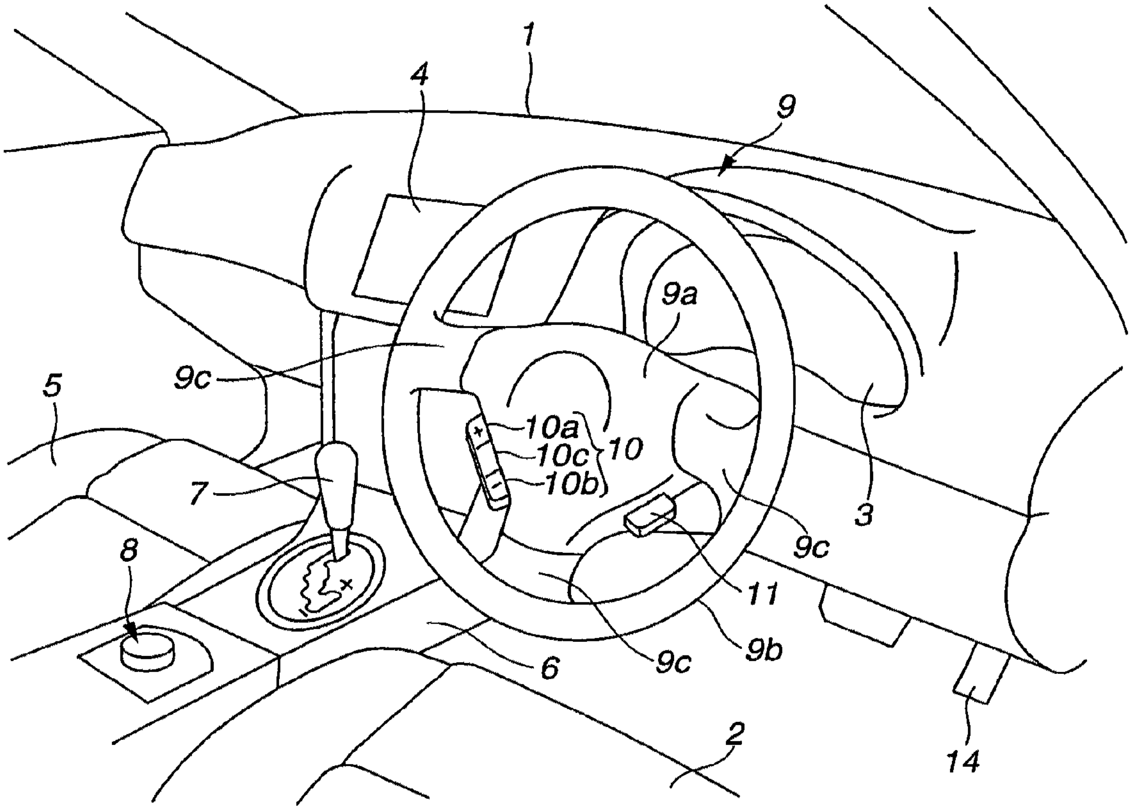
FIG. 1 is a perspective diagram shown an instrument panel and a center console seen from a driver side of first embodiment.

As shown in FIG. 1, an instrument panel 1 is provided to a front part in a room of a vehicle and extends in the width direction of the vehicle. The instrument panel 1 has a combination meter 3 at a position in front of a driver's seat 2. The instrument panel 1 also has a center display 4 for a known car navigation system at a central position thereof.

A center console 6 is disposed between the driver's seat 2 and a passenger's seat 5 and extends from the instrument panel 1 side toward the rear part of the vehicle body. The center console 6 is provided with a select lever 7 for selecting an automatic transmission range, and a mode select switch 8 at the rear of the select lever 7 for mainly selecting a driving power performance of an engine of the vehicle. A steering wheel 9 is further provided in front of the driver's seat 2.

The steering wheel 9 has a center pad portion 9*a* for housing an air-bag therein, and the center pad portion 9*a* is coupled to right, left, and lower portions of an outer peripheral grip portion 9*b* via three spokes 9*c*. A display change-over switch 10 is mounted to the lower left portion of the center pad portion 9*a*, and a temporarily change-over switch 11 is mounted to the lower right portion of the center pad portion 9*a*.

Figure 2:
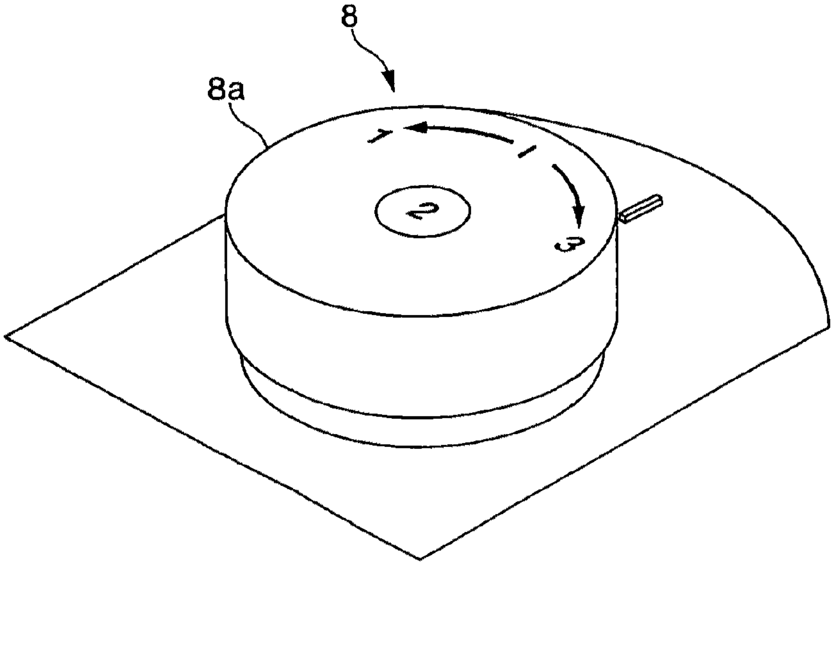
FIG. 2 is a perspective diagram showing a mode select switch.

As shown in FIG. 2, the mode select switch 8 is a shuttle switch having a push switch thereon, and an operation of a circular operation control knob 8*a* by an operator (usually a driver, and so hereinafter, simple referred to as a "driver") enables a selection of an engine mode M as one of the three control modes (a normal mode m1 and a save mode m2 as an output restricted mode, and a power mode m3 as a high output mode) which will be explained below. That is, in the present embodiment, a rotation of the operation control knob 8*a* to the left (in the direction designated by the reference number 1 of FIG. 2) causes the left side switch to be turned on to select the normal mode m1, and a rotation of the operation control knob 8*a* to the right (in the direction designated by the reference number 3 of FIG. 2) causes the right side switch to be turned on to select the power mode m3, and also a push of the operation control knob 8*a* downward (in the direction to press down the position designated by the reference number 2 of FIG. 2) causes the push switch to be turned on to select the save mode m2. The save mode m2 is assigned to the push switch, so that for example even if the push switch is turned on by mistake while driving, because an output torque is restricted in the save mode m2 as described below, a sudden increase of a driving power due to the switching of the control mode into the save mode m2 can be prevented, and a driver can continue to drive with ease.

Now, output performances of each modes m1 to m3 will be simply explained. The normal mode m1 is suitable to a normal driving, because an output torque in the normal mode m1 is set to approximately linearly change in proportion to the amount of an accelerator pedal 14 to be depressed (accelerator opening-degree) (see FIG. 8A), the accelerator pedal 14 being a unit configured to require an output by an external operation.

The save mode m2 is set to allow an enjoyable accelerator control with a smooth output performance based on a secured sufficient output by saving an engine torque, for example by synchronizing the torque with a lock-up control of a transmission in the automatic transmission equipped vehicle. Moreover, the save mode m2 in which an output torque is restricted can achieve well balanced properties of easy drive and good fuel economy (economical efficiency). For example, in a three liter engine equipped vehicle, the save mode m2 allows a smooth output performance based on a secured sufficient output which corresponds to a two liter engine, and is set to provide a performance for easy handling in practical regions such as town.

The power mode m3 is set to be a power-oriented mode with an output performance which is responsive to an engine from a low speed range to a high speed range. And, in an automatic transmission equipped vehicle, a sporty running condition on a winding road, for example, can be achieved by changing the shift-up points in matching with an engine torque. That is, the power mode m3 is set to be highly responsive to the amount of the accelerator pedal 14 to be depressed, and for example, in a three liter engine equipped vehicle, the power mode m3 is set to generate the maximum torque at an early timing so as to achieve the maximum potential of the three liter engine. The target outputs (target torques) of these control modes (the normal mode m1, the save mode m2, and the power mode m3) are set based on two parameters of an engine speed and an accelerator opening-degree as described below.

The display change-over switch 10 is operated to switch information displayed on a multi-information display (not shown) which is disposed to a position such as that on the instrument panel 1 or the combination meter 3 which is easily seen from a driver, and includes a forward switch portion 10*a*, backward switch portion 10*b*, and a reset switch portion 10*c*. For example, a display screen of a mileage (odometer and trip meter), a display screen of fuel consumption (average fuel consumption and instant fuel consumption), a display screen of driving time after ignition turned on, a display screen of a possible mileage depending on a remained fuel, and a display screen of an accelerator-torque relationship line in a selected engine mode are switched to be displayed on the multi-information display. In the display screen of an accelerator-torque relationship line, an accelerator-torque relationship line is plotted in a graph having a vertical axis for output torque of an engine and a horizontal axis for accelerator opening-degree, and the accelerator-torque relationship line is indicated in association with the up and down of the accelerator opening-degree.

Figure 3:
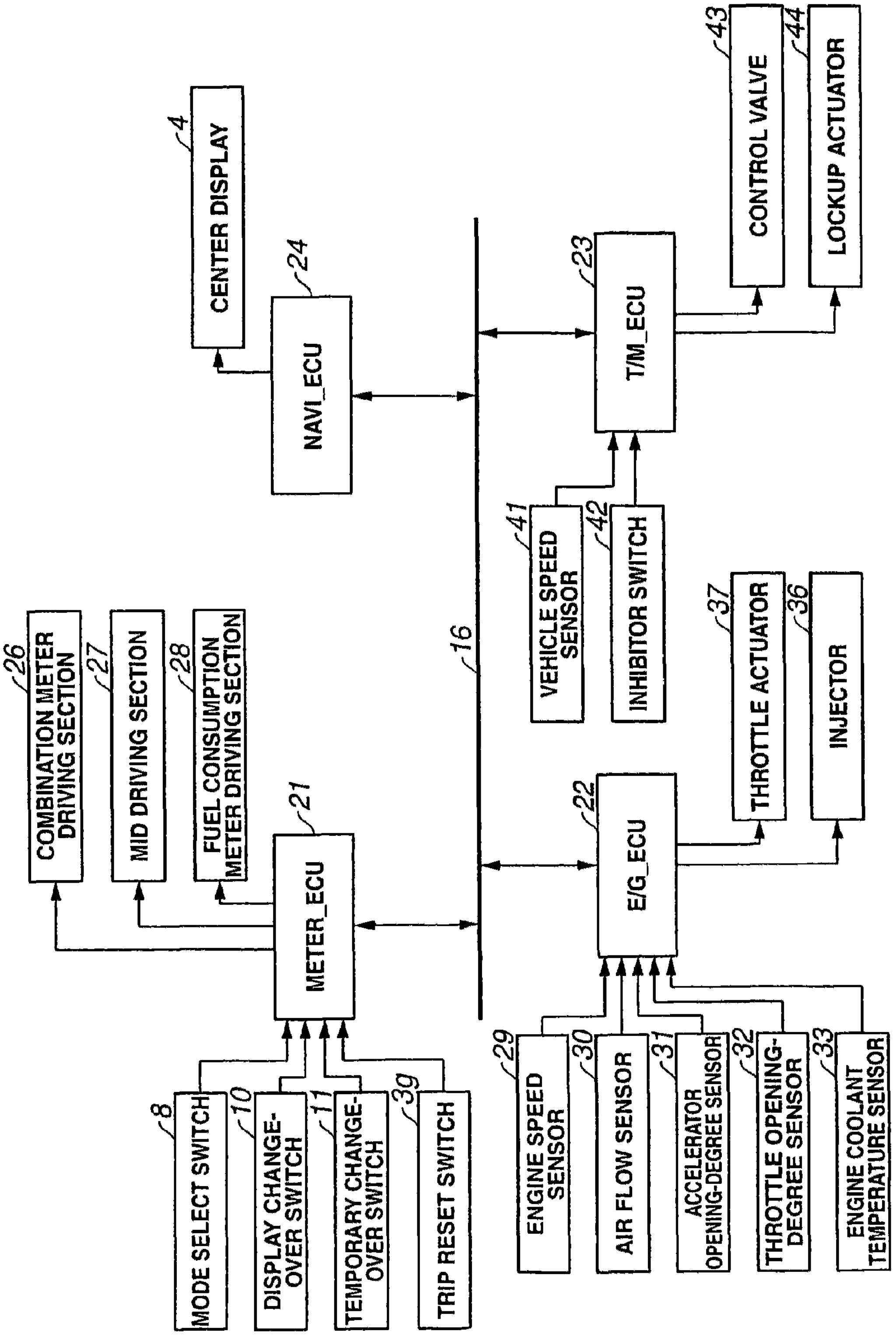
FIG. 3 is a block diagram showing a driving power control apparatus.

As shown in FIG. 3, the vehicle is connected to control apparatuses including a meter control apparatus (meter ECU) 21, an engine control apparatus (E/G ECU) 22, a transmission control apparatus (T/M ECU) 23, and a navigation control apparatus (navi ECU) 24 through an in-vehicle communication line 16 such as CAN (Controller Area Network) in an intercommunicating manner. Each of the ECUs 21 to 24 is configured with a computer such as a microcomputer as a main body, and has a nonvolatile storing unit such as known CPU, ROM, RAM, and EEPROM.

The meter ECU 21 controls the entire display of the combination meter 3, and is connected at the input side thereof to the mode select switch 8, the display change-over switch 10, the temporarily change-over switch 11, and a trip reset switch 3*g*. The meter ECU 21 is also connected at the output side thereof to a combination meter driving section 26 for driving each of the meters including a tachometer 3*a*, a speed meter 3*b*, an engine coolant temperature meter 3*c*, and a fuel level meter 3*d*, and a warning lamp 3*f*, a MID driving section 27 for driving and displaying a MID 12, and a fuel consumption meter driving section 28 for driving an indicating needle 13*a* of the fuel consumption meter 13.

The E/G ECU 22 controls the entire engine, and is connected at the input side thereof to sensors for detecting the vehicle and engine driving conditions, including an engine speed sensor 29 for detecting an engine speed from the rotation of a crankshaft and the like, an air flow sensor 30 for detecting the intake air flow which is disposed just downstream of an air cleaner, an accelerator opening-degree sensor 31 as a required output detecting unit (accelerator opening-degree detecting unit) for detecting an accelerator opening-degree, that is the required output from a driver, from the amount of the accelerator pedal 14 to be depressed, a throttle opening-degree sensor 32 for detecting the position of a throttle valve (not shown) which adjusts an intake air flow to be supplied to each cylinder of the engine through intake passages, and an engine coolant temperature sensor 33 for detecting a coolant temperature which shows the temperature of the engine. The E/G ECU 22 is also connected at the output side thereof to actuators for controlling the engine drive, including an injector 36 for injecting a measured predetermined amount of a fuel to each combustion chamber of each cylinder, and a throttle actuator 37 which is mounted to an electronic controlled throttle device (not shown).

The E/G ECU 22 sets a fuel injection timing for the injector 36 and a fuel injection pulse width (pulse time) based on the signals detected by the sensors. The E/G ECU 22 also outputs a throttle opening-degree signal to the throttle actuator 37 which drives the throttle valve so as to control the opening-degree of the throttle valve.

A nonvolatile storing unit provided to the E/G ECU 22 stores a plurality of driving power performances in the form of maps. In the present embodiment, three mode maps Mp1, Mp2, and Mp3 are provided for each driving power performance, and as shown in FIG. 8A to FIG. 8C, each of the mode maps Mp1, Mp2, and Mp3 is a three dimensional map with lattice axes for accelerator opening-degree and engine speed, and basic target torques TRQ1, TRQ2, and TRQ3 are individually stored in each lattice point thereof.

Each of the mode maps Mp1, Mp2, and Mp3 is basically selected by an operation of the mode select switch 8. That is, when the normal mode m1 is selected by the mode select switch 8, the normal mode map Mp1 is selected as a mode map, while when the save mode m2 is selected, the save mode map Mp2 is selected, and when the power mode m3 is selected, the save mode map Mp3 is selected.

Now, the driving power performance of each of the mode maps Mp1, Mp2, and Mp3 will be explained below. The normal mode map Mp1 shown in FIG. 8A is set to have characteristics that the basic target torque TRQ1 linearly changes at the region where the accelerator opening-degree is relatively low, and the torque reaches its maximum around the wide open throttle valve.

Compared to the above described normal mode map Mp1, the save mode map Mp2 shown in FIG. 8B is set to have characteristics that the increase of the basic target torque TRQ2 is restricted so that even when the accelerator pedal 14 is fully depressed, the output torque is restricted, which allows a driver to enjoy accelerator control by fully depressing the accelerator pedal 14 for example. In addition, the restricted increase of the basic target torque TRQ2 provides well balanced properties of easy drive and fuel economy performance. For example, in a three liter engine equipped vehicle, the save mode map Mp2 allows a smooth output performance based on a secured sufficient output which corresponds to a two liter engine, and is set to provide a performance for easy handling in practical regions such as town.

The power mode map Mp3 shown in FIG. 8C is set to have characteristics that the change rate of the basic target torque TRQ3 relative to the change of the accelerator opening-degree is set higher than other mode maps across the almost entire driving region. Therefore, for example, in a three liter engine equipped vehicle, a basic target torque TRQ3 is set to achieve the maximum potential of the three liter engine. Each of the mode maps Mp1, Mp2, and Mp3 is set to have an extremely low speed region including idle speed which provides almost identical driving power performance.

In this way, according to the present embodiment, upon an operation of the mode select switch 8 by a driver to select one of the modes m1, m2, and m3, a correspond mode maps Mp1, Mp2, or Mp3 is selected, and based on the corresponding mode map Mp1, Mp2, or Mp3, a basic target torque TRQ1, TRQ2, or TRQ3 is set, which allows the driver to enjoy three completely different accelerator responses in one vehicle. The opening and closing speed of the throttle valve is set to slowly move in the save mode map Mp2 and to quickly move in the power mode map Mp3.

The T/M ECU 23 controls the transmission of the automatic transmission, and is connected at its input side to a vehicle speed sensor 41 as vehicle speed detecting unit configured to detect a vehicle speed from the revolution of the transmission output shaft and the like, an inhibitor switch 42 for detecting a range in which the select lever 7 is set, and also is connected at its output side to a control valve 43 for controlling the automatic transmission and a lockup actuator 44 for causing a lockup clutch to lockup. The T/M ECU 23 determines a set range of the select lever 7 based on the signal from the inhibitor switch 42, and when a D range is set, in accordance to a predetermined shift pattern, the T/M ECU 23 outputs a transmission signal to the control valve 43 to control the transmission. The shift pattern is variably set in response to the modes m1, m2, and m3 set in the E/G ECU 22.

When a lockup condition is met, the T/M ECU 23 outputs a slip lockup signal or a lockup signal to the lockup actuator 44 to switch the input/output elements of a torque converter from a converter state to a slip lockup state or a lockup state. At this point, the E/G ECU 22 corrects a target torque $\tau e$ by synchronizing the target torque $\tau e$ to the slip lockup state and the lockup state. As a result, for example, when the engine mode M is set to the save mode m2, the target torque $\tau e$ is corrected to a value within a range for more economical running.

The navi ECU 24 is provided to a known car navigation system, and detects the position of the vehicle based on the position data obtained from GPS satellite or the like, and also calculates a leading passageway to a destination. Then, the current position of the vehicle and the leading passageway to the destination is displayed to the map data on the center display 4. In the present embodiment, the center display 4 is configured to display various information to be displayed on the MID 12.

Next, a program to control the driving state of an engine which is executed by the above described E/G ECU 22 will be explained in accordance with the flowcharts of FIG. 4 to FIG. 7.

Figure 4:
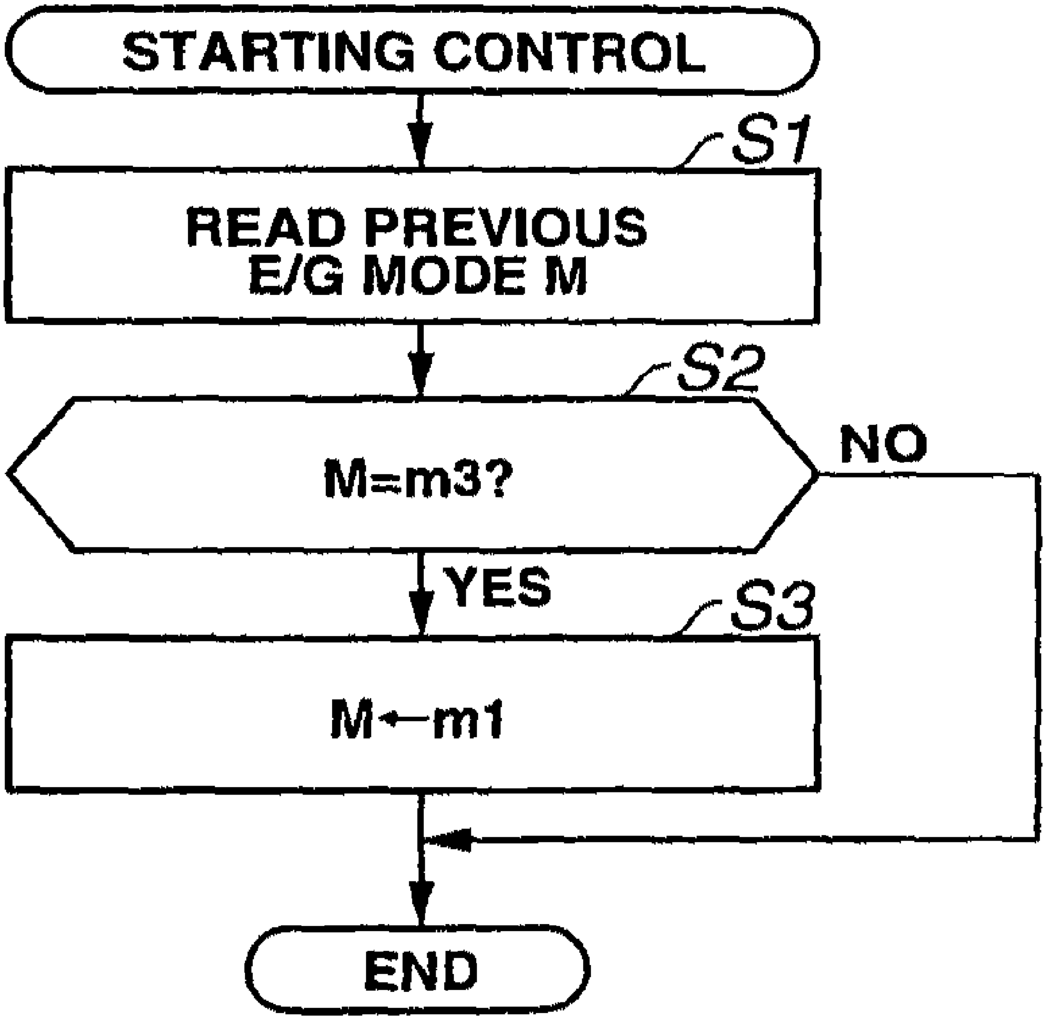
FIG. 4 is a flowchart illustrating a starting control routine.

First, a turning-on of the ignition switch causes the starting control routine shown in FIG. 4 to start only once. In this routine, first, at step S1, the engine mode M (M: normal mode m1, save mode m2, and power mode m3) which was set at the point of the previous turning-off of the ignition switch is read.

At step S2, it is checked if the engine mode M is the power mode m3 or not. When the power mode m3 is set, the engine mode M is forced to be set to normal mode m1 (M←m1), and the program exits the routine.

When the normal mode m1 or the save mode m2 other than the power mode m3 is set as the engine mode M, the program exits the routine without any process.

As described above, when it is found that the power mode m3 was set as the engine mode M at the point of the previous turning-off of the ignition switch, the engine mode M is forced to be set to normal mode m1 at this point of the turning-on of the ignition (M←m1). Therefore, a further depression of the accelerator pedal 14 does not cause a sudden start of the vehicle, thereby an excellent starting performance can be attained.

Figure 5:
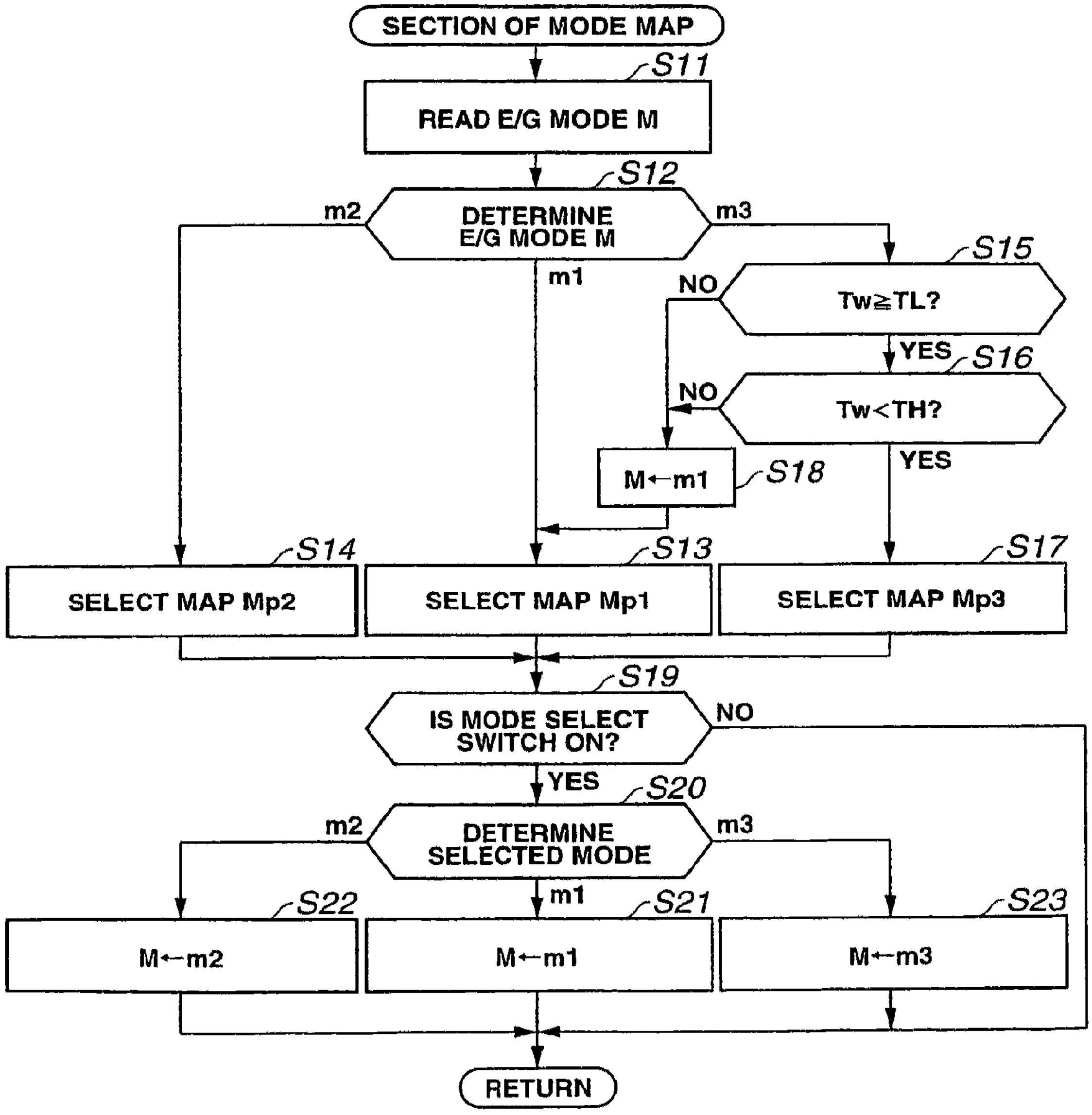
FIG. 5 is a flowchart illustrating a mode map selection routine.
Figure 6:
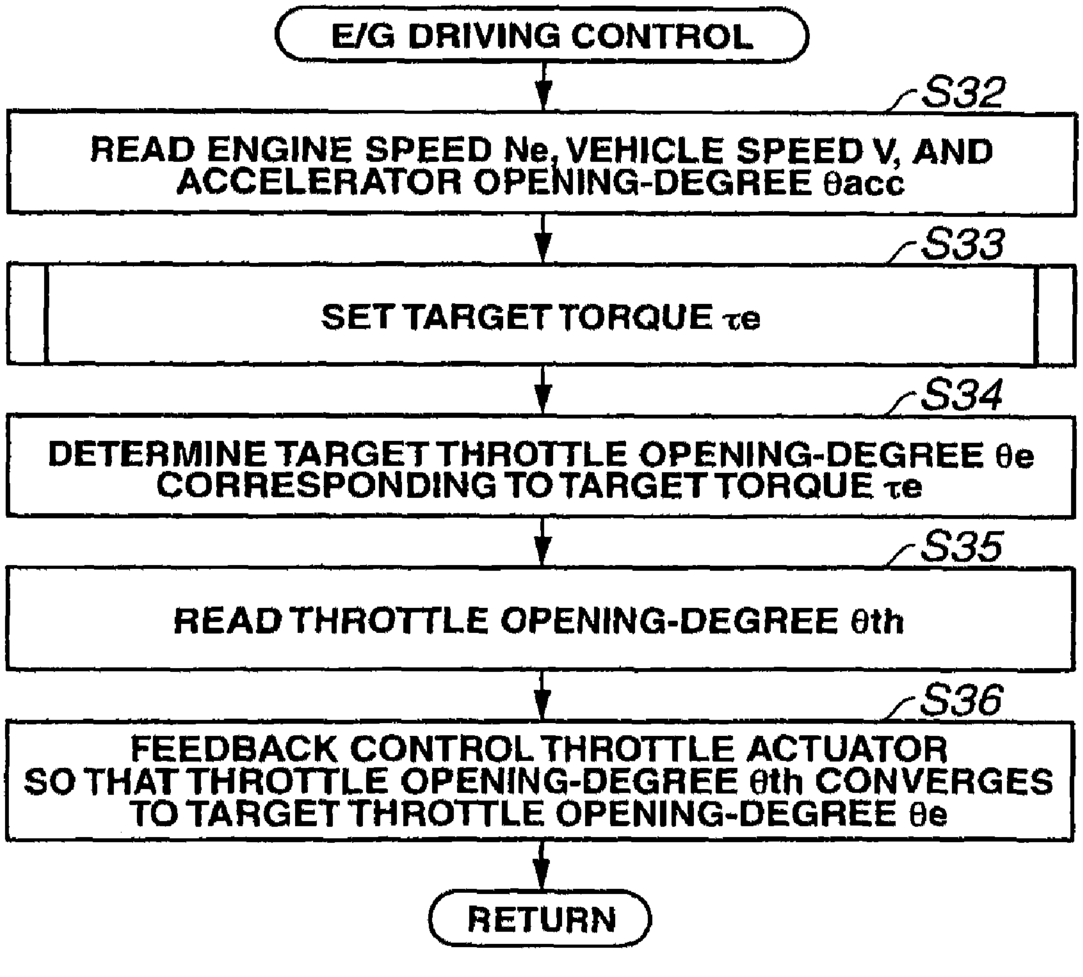
FIG. 6 is a flowchart illustrating an engine driving control routine.
Figure 7:
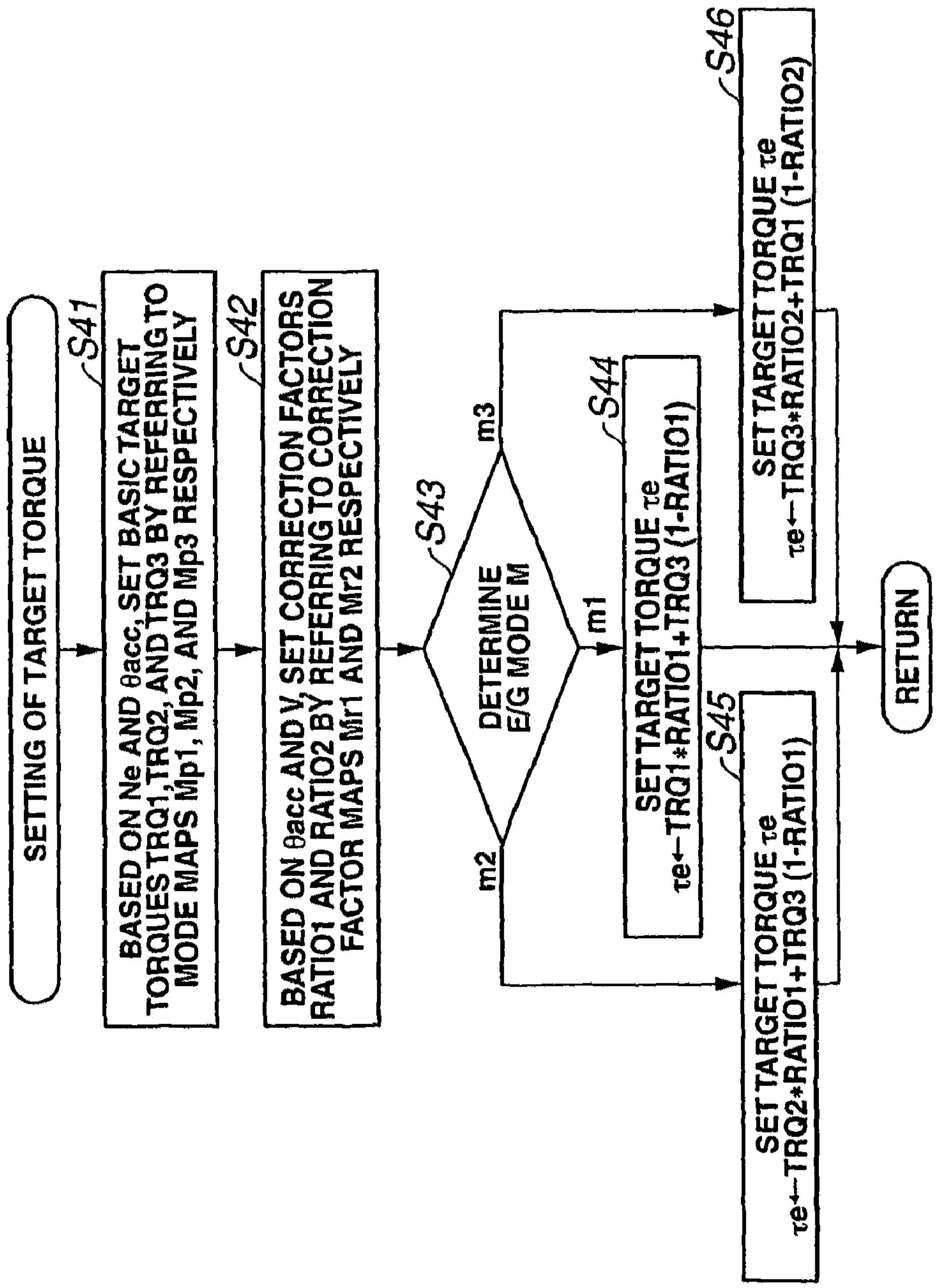
FIG. 7 is a flowchart illustrating a target torque setting subroutine.

Once the starting control routine ends, the routines shown in FIG. 5 to FIG. 7 are executed for every predetermined operation period. First, the mode map selecting routine shown in FIG. 5 will be explained.

In this routine, first, at step S11, the currently-set engine mode M is read, and at step S12, it is checked which one of the modes (normal mode m1, save mode m2, or power mode m3) is set, with reference to the value of the engine mode M. When the normal mode m1 is set, the program goes to step S13, and when the save mode m2 is set, the program branches to step S14, and when the power mode m3 is set, the program branches to step S15. Because the normal mode m1 or the save mode m2 is set as the engine mode M at the point of the first execution of the routine after the turning-on of the ignition switch, the program does not branch to step S15. However, after the turning-on of the ignition switch, if a driver turns the operation control knob 8*a* of the mode select switch 8 to the right to select the power mode m3, because the power mode m3 is set as the engine mode M at step S23 which will be explained later, in executing the routine after the selection, the program at step S12 branches to step S15.

After the determination that the normal mode m1 is set, at step S13, the normal mode map Mp1 stored in the nonvolatile storing unit of the E/G ECU 22 is set as a mode map for this time, and the program goes to step S19. Or after the determination that the save mode m2 is set, and the program branches to step S14, the save mode map Mp2 is set as a mode map for this time, and the program goes to step S19.

Meanwhile, after the determination that the power mode m3 is set, and the program branches to step S15, at step S15 and S16, the engine coolant temperature sensor 33 detects a coolant temperature Tw, a warm up determining temperature TL, and a high temperature determining temperature TH, which are then compared. If it is determined that the coolant temperature Tw is equal to or more than the warm up determining temperature TL at step S15 (Tw≧TL), and also it is determined that the coolant temperature Tw is less than the high temperature determining temperature TH at step S16 (Tw<TH), the program goes to step S17.

If it is determined that the coolant temperature Tw is less than the warm up determining temperature TL at step S15 (Tw<TL), or it is determined that the coolant temperature Tw is equal to or more than the high temperature determining temperature TH at step S16 (Tw≧TH), the program branches to step S18 to set the normal mode m1 as the engine mode M (M←m1), and goes back to step S13.

In this way, in the present embodiment, even if a driver operates the mode select switch 8 to select the power mode m3 after the turning-on of the ignition switch, when the coolant temperature Tw is equal to or less than the warm up determining temperature TL or is equal to or more than the high temperature determining temperature TH, the engine mode M is forced to be set to normal mode m1. Thereby, in warming up of the engine, the amount of exhaust emission is restricted, and at a high temperature of the engine, the output is restricted, so that the engine and its peripheral devices can be protected from heat damages. When the engine mode M is forced to be set to normal mode m1, the warning lamp 3*f* lights or blinks to inform the driver that the engine mode M is forced to return to normal mode m1. In this case, a buzzer or an audio message may be used to inform the returning.

Then, the program goes from one of step S13, S14, or S17 to step S19, and it is checked that the mode select switch 8 is turned on or not, and if not, the program leaves the routine as it is. If the mode select switch 8 is turned on, the program goes to step S20 to determine which mode the driver selects.

When it is determined the driver selects the normal mode m1 (i.e. the driver turns the operation control knob 8*a* to the left), the program goes to step S21 to set the normal mode m1 as the engine mode M (M←m1), and leaves the routine. When it is determined that the driver selects the save mode m2 (i.e. the driver pushes the operation control knob 8*a* downward), the program goes to step S22 to set the save mode m2 as the engine mode M (M+m2), and leaves the routine. When it is determined the driver selects the power mode m3 (i.e. the driver turns the operation control knob 8*a* to the right), the program goes to step S23 to set the power mode m3 as the engine mode M (M←m3), and leaves the routine.

In the present embodiment, after the turning-on of the ignition switch, since the power mode m3 can be set as the engine mode M by an operation of the operation control knob 8*a* of the mode select switch 8, the vehicle can be started in the power mode m3. However, in this case, because the driver selected the power mode m3 on purpose, if a large driving power is generated at the start of the vehicle, the driver does not panic. Moreover, as described below, at the start in the power mode m3, a correction of the engine torque is performed to restrict the engine torque, so that the driver will not be surprised by the sudden start.

Next, an engine driving control routine of FIG. 6 will be explained below.

In the routine, first, at step S32, an engine speed Ne detected by the engine speed sensor 29, an accelerator opening-degree θacc[%] detected by the accelerator opening-degree sensor 31, and a vehicle speed V [km/h] detected by the vehicle speed sensor 41 are individually read. The accelerator opening-degree θacc is expressed in terms of percentage, and the accelerator opening-degree θacc of 0[%] means that an accelerator pedal is not depressed at all, and the accelerator opening-degree θacc of 100[%] means that an accelerator pedal is fully depressed.

Then, the program goes to step S33 to set a target torque τe which is the target output. The target torque τe is set in a target torque setting subroutine which is shown in FIG. 7. In the subroutine, first, at step S41, basic target torques TRQ1, TRQ2, and TRQ3 are set based on the engine speed Ne and the accelerator opening-degree θacc, with reference to each of the mode maps Mp1, Mp2, and Mp3 with an interpolation.

Then, at step S42, correction factors RATIO1 and RATIO2 are set based on the accelerator opening-degree θacc and the vehicle speed V, with reference to a normal/save correction factor map Mr1 and a power correction factor map Mr2 with an interpolation. The program at step S42 corresponds to a correction factor setting unit.

Figure 9:
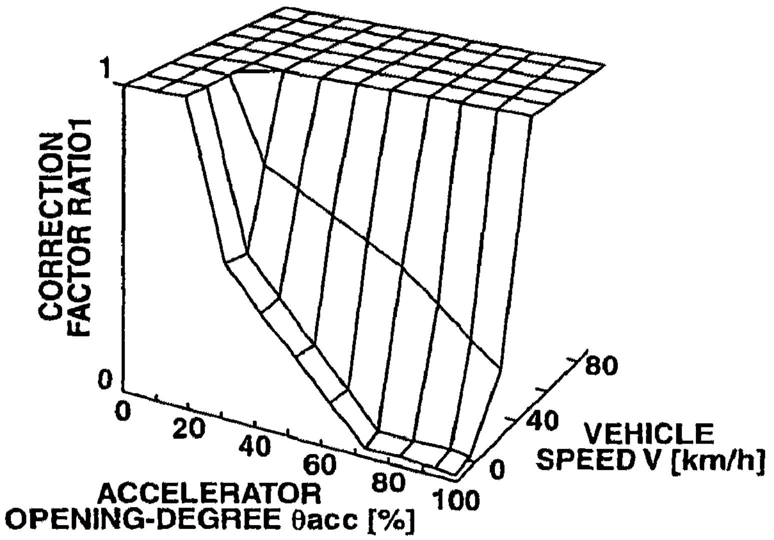
FIG. 9 is a conceptual diagram showing a normal/save correction factor map.
Figure 10:
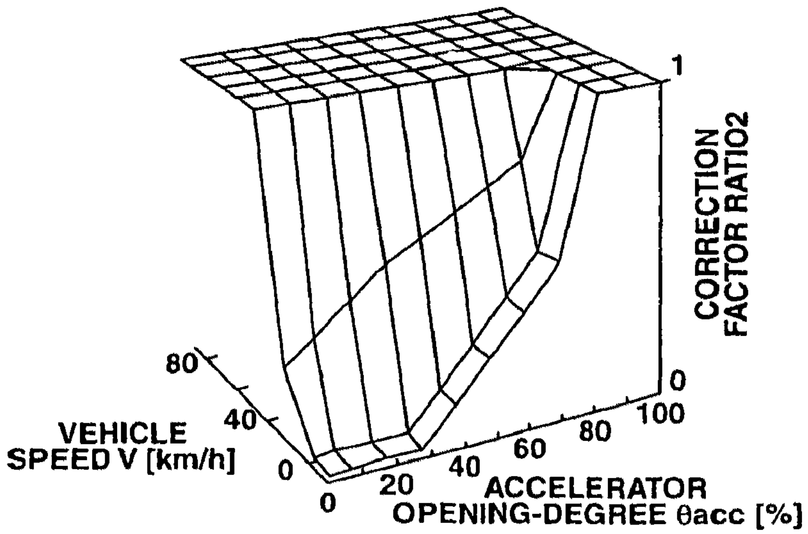
FIG. 10 is a conceptual diagram showing a power correction factor map.

FIG. 9 shows the characteristics of the normal/save correction factor map Mr1, while FIG. 10 shows the characteristics of the power correction factor map Mr2. Each of the correction factor maps Mr1 and Mr2 is a three dimensional map which has lattice axes for accelerator opening-degree θacc and vehicle speed V and the correction factors RATIO1 and RATIO2 individually stored in each lattice point thereof. The characteristics of each correction factor map Mr1 and Mr2 will be explained in detail below at steps S44 to S46.

Then, the program goes to step S43 to check which mode (normal mode m1, save mode m2, or power mode m3) is selected, with reference to the value of the engine mode M. When the normal mode m1 is set, the program goes to step S44, and when the save mode m2 is set, the program branches to step S45, and when the power mode m3 is set, the program goes to step S46. The process at step S43 corresponds to the mode determining unit. And the processes at steps S44 to S46 described below correspond to the target output setting unit.

At step S44 after the determination of the normal mode m1 as the engine mode M, the target torque τe is calculated based on the basic target torque TRQ1 which is set with reference to the normal mode map Mp1, the basic target torque TRQ3 which is set with reference to the power mode map Mp3, and the correction factor RATIO1 which is set with reference to the normal/save correction factor map Mr1, according to the following formula:

$$\tau e \leftarrow TRQ1*RATIO1+TRQ3*(1-RATIO1) \quad (1)$$

The correction factor RATIO1 is a value which represents an addition rate of the basic target torques TRQ1 and TRQ3, and as shown in FIG. 9, the normal/save correction factor map Mr1 stores the correction factor RATIO1 which rapidly decreases when the vehicle speed V is low (about 0 to 20 [km/h]) and the accelerator opening-degree θacc is high (about 70 to 100[%]) (where 0; RATIO1), and reaches the maximum value (=1) when the vehicle speed V is equal to or more then about 20 [km/h] or the accelerator opening-degree θacc is about 20[%] or less.

According to the Formula (1), the target torque τe which is set in the normal mode m1 selected as the engine mode M increases when the vehicle speed V is around at 0 [km/h], because the addition rate of the basic target torque TRQ1 which is set with reference to the normal mode map Mp1 decreases and the addition rate of the basic target torque TRQ3 which is set with reference to the power mode map Mp3 increases as the accelerator opening-degree θacc increases, in other words, as the required output by a driver increases. Therefore, even if the driver selected the normal mode m1 as the engine mode M, at a start of a vehicle under a high load such as a start on an upslope, a deep depression of the accelerator pedal 14 causes the engine torque to be increased, thereby a smooth starting performance can be attained.

The correction factor RATIO1 after the start is rapidly increased to reach 1 as the vehicle speed V rises. Accordingly, the addition rate of the basic target torque TRQ3 decreases and the addition rate of the basic target torque TRQ1 relatively increases, resulting in that at the point where the RATIO1=1, the target torque τe reaches the basic target torque TRQ1 which is set with reference to the normal mode map Mp1 (τe=TRG1). Therefore, a depression of the accelerator pedal 14 after start does not cause the vehicle to be suddenly started and a smooth start can be attained. In addition, after the start, the addition rate of the basic target torque TRQ1 is automatically increased and the addition rate of the basic target torque TRQ3 is relatively decreased, which gradually restricts the engine torque and achieves a better driving performance, compared to the case, for example, in which the normal mode map Mp1 and the power mode map Mp3 are switched to be used depending on an accelerator opening-degree θacc and a vehicle speed V.

When the program goes from step S43 to step S45 after the determination of the save mode m2 as the engine mode M, the target torque τe is calculated based on the basic target torque TRQ2 which is set with reference to the save mode map Mp2, the basic target torque TRQ3 which is set with reference to the power mode map Mp3, and the correction factor RATIO1 which is set with reference to the normal/save correction factor map Mr1, according to the following formula:

$$\tau e \leftarrow TRQ2*RATIO1+TRQ3*(1-RATIO1) \quad (2)$$

The characteristics of the normal/save correction factor map Mr1 is described above and will not be repeated. In the present embodiment, the normal/save correction factor map Mr1 is commonly used in the normal mode m1 and the save mode m2, but correction factor maps having different characteristics may be individually used for the modes m1 and m2.

According to the Formula (2), the target torque τe which is set in the save mode m2 selected as the engine mode M increases when the vehicle speed V is around at 0 [km/h], because the addition rate of the basic target torque TRQ1 which is set with reference to the normal mode map Mp1 decreases and the addition rate of the basic target torque TRQ3 which is set with reference to the power mode map Mp3 relatively increases as the accelerator opening-degree θacc increases. Therefore, even if a driver selected the save mode m2 as the engine mode M, at a start of a vehicle under a high load such as a start on an upslope, a deep depression of the accelerator pedal 14 causes the engine torque to be rapidly increased, thereby a smooth starting performance can be attained.

In particular, as shown in FIG. 8B, the basic target torque TRQ2 which is set with reference to the save mode map Mp2 is the value lower than the inherent maximum output of the engine even when the accelerator pedal 14 is fully depressed, so that the throttle opening-degree θth[%] does not go up to the maximum. This may cause an insufficient torque at a start under a high load such as a start on a slope when the save mode m2 is set as the engine mode M although the power mode m3 may prevent the insufficient torque under the same condition. However, in the present embodiment, a depression of the accelerator pedal 14 causes the throttle valve to move beyond the upper limit throttle opening-degree which is originally restricted, thereby the engine torque is automatically increased and a smooth start performance can be attained.

The correction factor RATIO1 after the start is, as described above, rapidly increased to reach 1 as the vehicle speed V rises, and at the point where the RATIO1=1, the target torque τe reaches the basic target torque TRQ2 which is set with reference to the save mode map Mp2 (τe=TRG2). Therefore, a depression of the accelerator pedal 14 after start does not cause the vehicle to be suddenly started, and a smooth start can be attained. In addition, after the start, the addition rate of the basic target torque TRQ1 is automatically increased and the addition rate of the basic target torque TRQ3 is relatively decreased, which smoothly makes the torque fall within the original torque control range for the normal mode m1, and achieves an excellent driving performance.

When the program goes to step S46 after the determination of the power mode m3 as the engine mode M, the target torque τe is calculated based on the basic target torque TRQ3 which is set with reference to the power mode map Mp3, the basic target torque TRQ1 which is set with reference to the power mode map Mp1, and the correction factor RATIO2 which is set with reference to the power correction factor map Mr2, according to the following formula:

$$\tau e \leftarrow TRQ3*RATIO2+TRQ1*(1-RATIO2) \quad (3)$$

The correction factor RATIO2 is a value which represents a addition rate of the basic target torques TRQ1 and TRQ3, and as shown in FIG. 10, the power correction factor map Mr2 stores the correction factor RATIO2 which rapidly decreases when the vehicle speed V is low (about 0 to 20 [km/h]) and the accelerator opening-degree θacc is low (about 0 to 30[%]) (where 0≠RATIO2), and reaches the maximum value (=1) when the vehicle speed V is equal to or more then about 20 [km/h] or the accelerator opening-degree θacc is about 30[%] or more.

According to the Formula (3), the target torque τe which is set in the power mode m3 selected as the engine mode M decreases when the vehicle speed V is around at 0 [km/h], because the addition rate of the basic target torque TRQ3 which is set with reference to the power mode map Mp3 decreases and the addition rate of the basic target torque TRQ1 which is set with reference to the normal mode map Mp1 relatively increases as the accelerator opening-degree θacc decreases, in other words, as the required output by a driver decreases. Therefore, even if the driver selected the power mode m3 as the engine mode M, at a start of a vehicle, a slight depression of the accelerator pedal 14 causes the engine torque to be transited to the normal mode side, thereby an excess torque can be prevented, and a smooth starting performance can be attained.

The correction factor RATIO2 after the start is rapidly increased to reach 1 as the vehicle speed V rises. Accordingly, the addition rate of the basic target torque TRQ1 decreases and the addition rate of the basic target torque TRQ3 relatively increases, resulting in that at the point where the RATIO2=1, the target torque τe reaches the basic target torque TRQ3 which is set with reference to the power mode map Mp3 (τe=TRG3). Therefore, although the amount of the accelerator pedal to be depressed after start is constant, the engine torque is automatically increased as the vehicle speed V rises, thereby a further depression of the accelerator pedal under this condition achieves an excellent acceleration response. In addition, after the start, the addition rate of the basic target torque TRQ3 is automatically increased and the addition rate of the basic target torque TRQ1 is relatively decreased, which smoothly makes the torque fall within the original torque control range for the power mode m3 and achieves an excellent driving performance, compared to the case, for example, in which the power mode map Mp3 and the normal mode map Mp1 are switched to be used depending on an accelerator opening-degree θacc and a vehicle speed V.

After the target torque τe is set at one of steps S44 to S46, the program goes to step S34 of FIG. 6, and a target throttle opening-degree θe[%] which is the final target output corresponding to the target torque τe is determined.

Next, at step S35, the throttle opening-degree θth detected by the throttle opening-degree sensor 32 is read, and at step S36, the throttle actuator 37 for opening/closing the throttle valve mounted to an electric controlled throttle device is feedback controlled so that the throttle opening-degree θth converges to the target throttle opening-degree θe, and the program leaves the routine.

As described above, the target torque τe set by the E/G ECU 22 for each engine mode M (M: m1, m2, and m3) is set to be the basic target torques TRQ1, TRQ2, and TRQ3 respectively according to the Formulas (1) to (3) when the vehicle speed V is equal to or more than a set vehicle speed (about 20 [km/h]) and the correction factors RATIO1 and RATIO2 of the correction factor maps Mr1 and Mr2 reach 1.

The basic target torque TRQ1 which linearly changes in proportion to the amount of the accelerator pedal 14 to be depressed (accelerator opening-degree θacc) is suitable to a normal driving. The basic target torque TRQ2 having the upper limit allows a driver to enjoy accelerator control by fully depressing the accelerator pedal 14 for example, and provides well balanced properties of easy drive and fuel economy performance. Therefore, in a three liter engine equipped vehicle, a smooth output performance can be achieved while securing sufficient output which corresponds to a two liter engine, and a performance for easy handling in practical regions such as town can be attained. The basic target torque TRQ3 which is highly responsive provides a sporty running.

As a result, a driver can enjoy three completely different accelerator responses in one vehicle. So the driver after the purchase of the vehicle can optionally select any driving power performance as desired, and can enjoy three different driving performances of three vehicles in one vehicle.

At a start under a high load such as a start on a slope while the normal mode m1 or the save mode m2 is set as the engine mode M, if a vehicle does not start upon a depression of the accelerator pedal 14 to some degree by a driver, the driver further depresses the accelerator pedal 14. Then the correction factor RATIO1 which is set with reference to the normal/save correction factor map Mr1 goes below 1, and accordingly as shown in the above Formula (1) or (2), the target torque τe is supplemented due to the increased addition rate of the basic target torque TRQ3 which is set with reference to the power mode map Mp3, and an excellent starting performance can be attained.

Figure 11A:
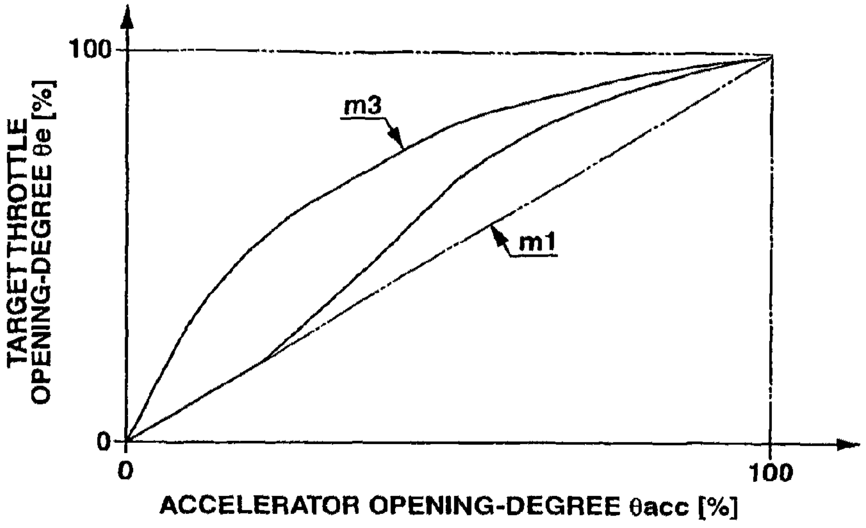
FIG. 11A is a characteristic chart showing changes of a target throttle opening-degree under a high load at the start of a vehicle, in a normal mode.

FIG. 11A shows a relationship between an accelerator opening-degree θacc and a target throttle opening-degree θe at a start under a high load in the normal mode m1 as the engine mode M.

At a start under a high load such as a start on a slope, if a vehicle does not start upon a depression of the accelerator pedal 14 to some degree by a driver, the driver further depresses the accelerator pedal 14. Then the target throttle opening-degree θe is corrected by an addition rate of the correction factor RATIO1 to the characteristics to be closer to the throttle opening-degree corresponding to the basic target torque TRQ3 which is set with reference to the power mode map Mp3 in the power mode m3 shown by a thinner line than to the throttle opening-degree corresponding to the basic target torque TRQ1 which is set with reference to the normal mode map Mp1 shown by a dashed line. Therefore, at a start under a high load, for example, a deep depression of the accelerator pedal 14 toward the fully depressed position (θacc=100[%]) at a low vehicle speed of about 10 [km/h] or less causes a bulge of the target throttle opening-degree θe, which causes a large increase of the output torque and achieves a smooth start of the vehicle.

Figure 11B:
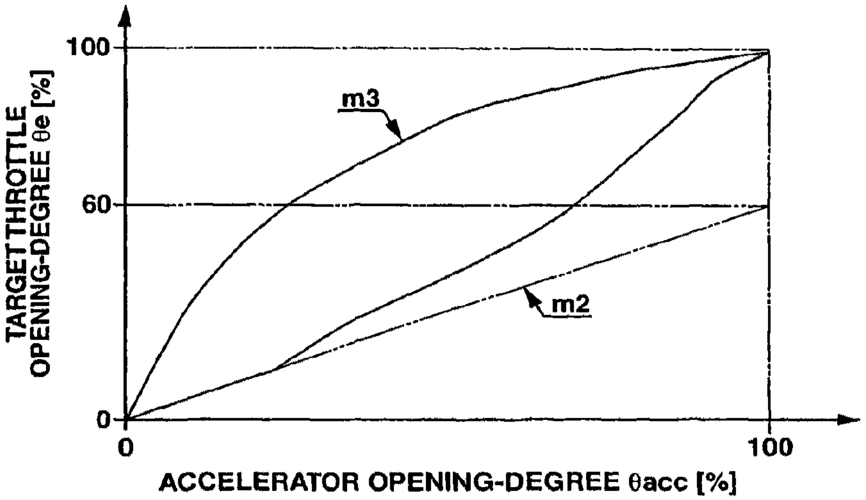
FIG. 11B is a characteristic chart showing changes of a target throttle opening-degree under a high load at the start of a vehicle, in a save mode.

FIG. 11B shows a relationship between an accelerator opening-degree θacc and a target throttle opening-degree θe at a start under a high load in the save mode m2 as the engine mode M.

As in the case described above, upon a deep depression of the accelerator pedal 14 by a driver at a start under a high load, the target throttle opening-degree θe is corrected by an addition rate of the correction factor RATIO1 to the characteristics to be closer to the throttle opening-degree corresponding to the basic target torque TRQ3 which is set with reference to the power mode map Mp3 in the power mode m3 shown by a thinner line than to the throttle opening-degree corresponding to the basic target torque TRQ2 which is set with reference to the save mode map Mp2 shown by a dashed line. Therefore, at a start under a high load, for example, a deep depression of the accelerator pedal 14 toward the fully depressed position (θacc=100[%]) in a low vehicle speed of about 10 [km/h] or less causes the target throttle opening-degree θe to be set on the side of the maximum throttle opening-degree (100[%]) beyond the originally restricted throttle opening-degree (60 [%] in FIG. 11B), which causes a large increase of the output torque and achieves a smooth start of the vehicle.

Figure 11C:
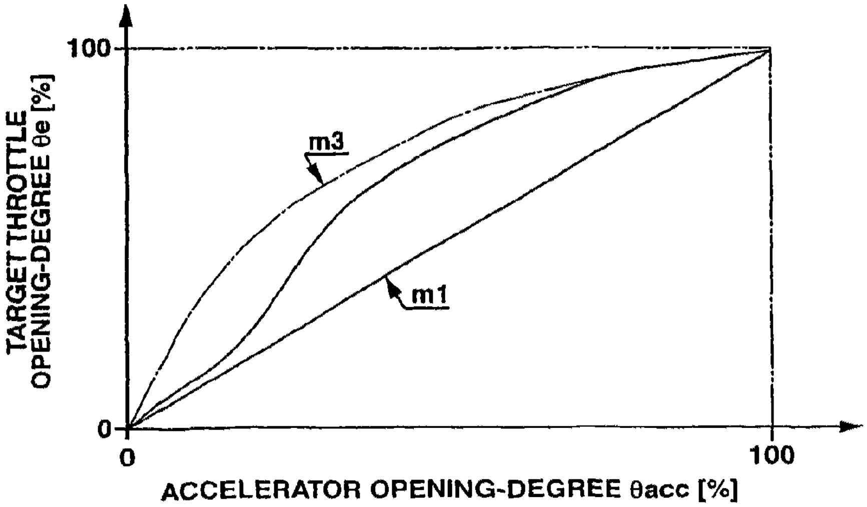
FIG. 11C is a characteristic chart showing changes of a target throttle opening-degree under a low load at the start of a vehicle, in a power mode.

FIG. 11C shows a relationship between an accelerator opening-degree θacc and a target throttle opening-degree θe at a start under a high load in the power mode m3 as the engine mode M.

In the power mode m3, upon a slight depression of the accelerator pedal 14 by a driver at a start under a low load such as a start on level ground, the target throttle opening-degree θe is corrected by an addition rate of the correction factor RATIO2 to the characteristics to be closer to the throttle opening-degree corresponding to the basic target torque TRQ1 which is set with reference to the normal mode map Mp1 in the normal mode m1 shown by a thinner line than to the throttle opening-degree corresponding to the basic target torque TRQ3 which is set with reference to the power mode map Mp3 shown by a dashed line. Therefore, at a start under a low load, for example, upon a slight depression of the accelerator pedal 14 at a low vehicle speed of about 10 [km/h] or less, an excess torque can be prevented due to the restricted target throttle opening-degree θe, so that the driver will not be surprised by a sudden start, and the vehicle smoothly starts.

Second Embodiment

Figure 12:
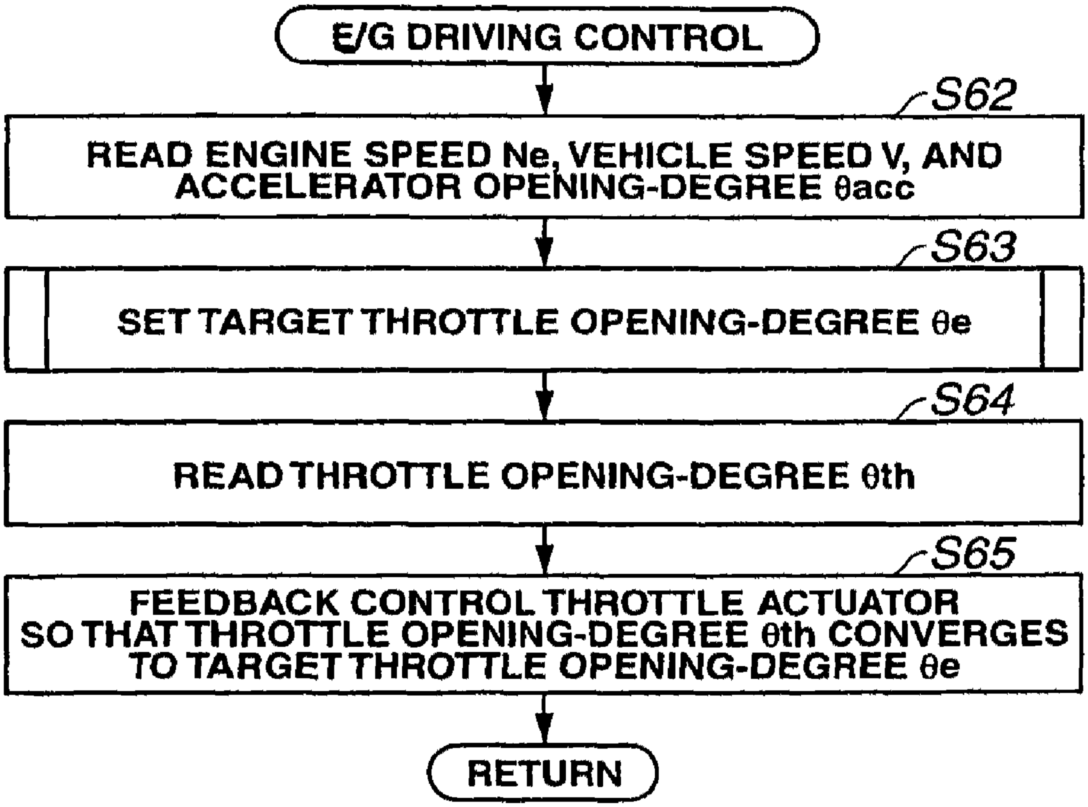
FIG. 12 is a flowchart illustrating an engine driving control routine.
Figure 13:
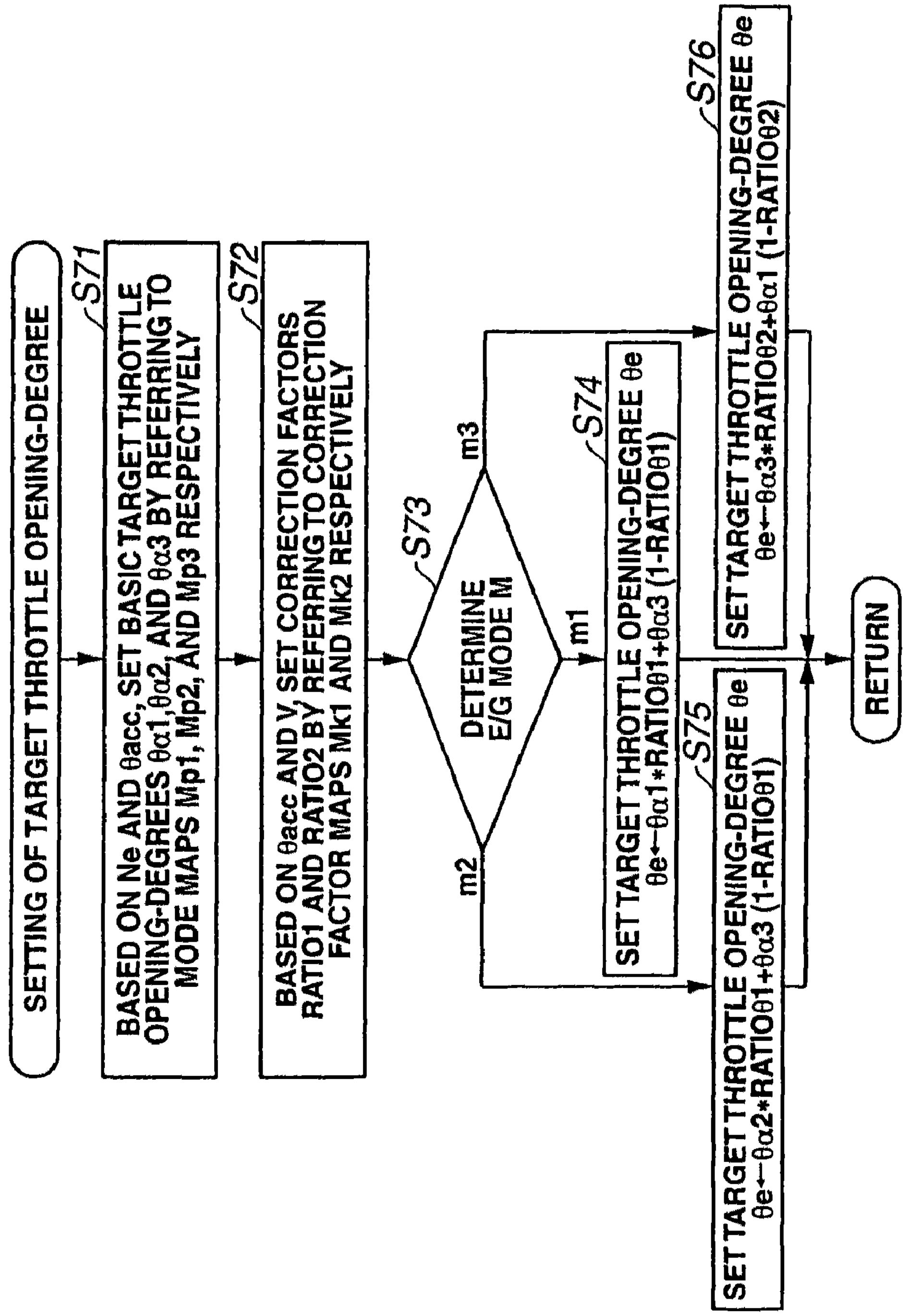
FIG. 13 is a flowchart illustrating a target throttle opening-degree setting subroutine.

The present embodiment is a modification of the above described first embodiment, and the flowcharts shown in FIG. 12 and FIG. 13 are applied instead of the flowcharts shown in FIG. 6 and FIG. 7, while each of the mode maps shown in FIG. 14 are applied instead of the each of the mode maps shown in FIG. 8. Other configurations of the present embodiment are identical to those in the first embodiment, and will not be explained below.

In the above described first embodiment, in order to set a target throttle opening-degree θe, first, basic target torques TRQ1, TRQ2, and TRQ3 are set, and based on the basic target torques TRQ1, TRQ2, and TRQ3, a target torque τe is calculated. However, in the present embodiment, basic target throttle opening-degrees θα1, θα2, and θα3 are set instead of the basic target torques TRQ1, TRQ2, and TRQ3, and based on the basic target throttle opening-degrees θα1, θα2, and θα3, a target throttle opening-degree θe is calculated.

That is, in the engine driving control routine shown in FIG. 12, first, at step S62, an engine speed Ne, an accelerator opening-degree θacc, and a vehicle speed V [km/h] are individually read, and at step S63, a target throttle opening-degree θe which is the target output is set. The target throttle opening-degree θe is set in the target throttle opening-degree setting subroutine shown in FIG. 13. In the subroutine, first, at step S71, based on the engine speed Ne and the accelerator opening-degree θacc, basic target throttle opening-degrees θα1, θα2, and θα3 are set with reference to each of the mode maps Mpθ1, Mpθ2, and Mpθ3 shown in FIG. 14A to FIG. 14C respectively with an interpolation. Each of the mode maps Mpθ1, Mpθ2, and Mpθ3 shown in FIG. 14A to FIG. 14C is a three dimensional map which has lattice axes for accelerator opening-degree and engine speed and the basic target throttle opening-degrees θα1, θα2, and θα3 individually stored in each lattice point thereof. The characteristics of each of the mode maps Mpθ1, Mpθ2, and Mpθ3 are identical to those of the above described mode maps Mp1, Mp2, and Mp3 shown in FIG. 8A to FIG. 8C.

Next, at step S72, correction factors RATIO1 and RATIO2 are set with reference to the normal/save correction factor map Mk1 and the power correction factor map Mk2 with an interpolation based on the accelerator opening-degree θacc and the vehicle speed V. The characteristics of the normal/save correction factor map Mk1 and the power correction factor map Mk2 are identical to the maps shown in FIG. 9 and FIG. 10, and will not be explained below.

Then, the program goes to step S73 to check which mode (normal mode m1, save mode m2, or power mode m3) is selected with reference to the value of the engine mode M. When the normal mode m1 is set, the program goes to step S74, and when save mode m2 is set, the program branches to step S75, and when the power mode m3 is set, the program goes to step S76.

At step S74 after the determination of the normal mode m1 as the engine mode M, the target throttle opening-degree θe is calculated based on the basic target throttle opening-degree θα1 which is set with reference to the normal mode map Mpθ1, the basic target throttle opening-degree θα3 which is set with reference to the power mode map Mpθ3, and the correction factor RATIOθ1 which is set with reference to the normal/save correction factor map Mk1, according to the following formula:

$$\theta e \leftarrow \theta\alpha 1 * RATIO\theta 1 + \theta\alpha 3 * (1 - RATIO\theta 1) \quad (1')$$

According to Formula (1'), the target throttle opening-degree θe which is set in the normal mode m1 selected as the engine mode M increases when the vehicle speed V is around at 0 [km/h], because the addition rate of the basic target throttle opening-degree θα1 which is set with reference to the normal mode map Mpθ1 decreases and the addition rate of the basic target throttle opening-degree θα3 which is set with reference to the power mode map Mpθ3 relatively increases as the accelerator opening-degree θacc increases. Therefore, as in the first embodiment, at a start of a vehicle under a high load such as a start on an upslope, a deep depression of the accelerator pedal 14 achieves a smooth starting performance.

The correction factor RATIOθ1 after the start is rapidly increased to reach 1 as the vehicle speed V rises. Therefore, a depression of the accelerator pedal 14 after start does not cause the vehicle to be suddenly started and a smooth start performance can be attained. In addition, after the start, the addition rate of the basic target throttle opening-degree θα1 is automatically increased and the addition rate of the basic target throttle opening-degree θα3 is relatively decreased, which smoothly makes the torque fall within the original torque control range for the normal mode m1 and achieves an excellent driving performance, as in the first embodiment.

When the program goes from step S73 to step S75 after the determination of the save mode m2 as the engine mode M, the target throttle opening-degree θe is calculated based on the target throttle opening-degree θα2 which is set with reference to the save mode map Mpθ2, the basic target throttle opening-degree θα3 which is set with reference to the power mode map Mpθ3, and the correction factor RATIOθ1 which is set with reference to the normal/save correction factor map Mk1, according to the following formula:

$$\theta e \leftarrow \theta\alpha 2 * RATIO\theta 1 + \theta\alpha 3 * (1 - RATIO\theta 1) \quad (2')$$

According to the Formula (2'), the target throttle opening-degree θe which is set in the save mode m2 selected as the engine mode M increases when the vehicle speed V is around at 0 [km/h], because the addition rate of the basic target throttle opening-degree θα1 which is set with reference to the normal mode map Mpθ1 decreases and the addition rate of the basic target throttle opening-degree θα3 which is set with reference to the power mode map Mpθ3 relatively increases as the accelerator opening-degree θacc increases. Therefore, even if a driver selected the save mode m2 as the engine mode M, at a start of a vehicle under a high load such as a start on an upslope, a deep depression of the accelerator pedal 14 achieves a smooth starting performance, as in the first embodiment.

In particular, as shown in FIG. 14B, the basic target throttle opening-degree θα2 which is set with reference to the save mode map Mpθ2 has a characteristics that the throttle opening-degree θth[%] does not go up to the maximum even when the accelerator pedal 14 is fully depressed. This may cause an insufficient torque at a start under a high load such as a start on a slope in the save mode m2. However, in the present embodiment, a depression of the accelerator pedal 14 makes the engine torque automatically transit to the power mode side, and causes the throttle valve to open beyond the upper limit throttle opening-degree which is originally restricted, thereby a smooth start performance can be attained.

The correction factor RATIOθ1 after the start is, as described above, rapidly increased to reach 1 as the vehicle speed V rises. Therefore, a depression of the accelerator pedal 14 after start does not cause the vehicle to be suddenly started and a smooth start can be attained. In addition, after the start, the addition rate of the basic target throttle opening-degree θα1 is automatically increased, which smoothly makes the torque fall within the original torque control range for the save mode m2 and achieves an excellent driving performance.

When the program goes to step S76 after the determination of the power mode m3 as the engine mode M, the target throttle opening-degree θe is calculated based on the basic target throttle opening-degree θα3 which is set with reference to the power mode map Mpθ3, the basic target throttle opening-degree θα1 which is set with reference to the normal mode map Mpθ1, and the correction factor RATIOθ2 which is set with reference to the power correction factor map Mk2, according to the following formula:

$$\theta e \leftarrow \theta\alpha 3 * RATIO\theta 2 + \theta\alpha 1 * (1 - RATIO\theta 2) \quad (3')$$

According to the Formula (3'), the target throttle opening-degree θe which is set in the power mode m3 selected as the engine mode M decreases when the vehicle speed V is around at 0 [km/h], because the addition rate of the basic target throttle opening-degree θα3 which is set with reference to the power mode map Mpθ3 decreases and the addition rate of the basic target throttle opening-degree θα1 which is set with reference to the normal mode map Mpθ1 relatively increases as the accelerator opening-degree θacc decreases. Therefore, even if the driver selected the power mode m3 as the engine mode M, at a start of a vehicle, a slight depression of the accelerator pedal 14 does not causes an excess torque, and a smooth starting performance can be attained.

The correction factor RATIOθ2 after the start is rapidly increased to reach 1 as the vehicle speed V rises. Therefore the original acceleration response in the power mode m3 can be automatically attained. In addition, after the start, the addition rate of the basic target throttle opening-degree θα3 is automatically increased and the addition rate of the basic target throttle opening-degree θα1 is relatively decreased, which smoothly makes the torque fall within the original torque control range for the power mode map Mpθ3 and achieves an excellent driving performance. The process at step S74 to S76 corresponds to the target output setting unit.

After the target throttle opening-degree θe is set at one of step S74 to S76, the program goes to step S64 of FIG. 12. At step S64, the throttle opening-degree θth which detected by the throttle opening-degree sensor 32 is read, and at step S65, the throttle actuator 37 for opening/closing the throttle valve mounted to the electric controlled throttle device is feedback controlled so that the throttle opening-degree θth converges to the target throttle opening-degree θe set at step S63 described above, and the program leaves the routine.

In this way, in the present embodiment, the basic target throttle opening-degrees θα1, θα2, and θα3 are set with reference to each of the mode maps Mpθ1, Mpθ2, and Mpθ3, and based on the basic target throttle opening-degrees θα1, θα2, and θα3, the target throttle opening-degree θe is set. Thereby in addition to the advantage in the above described first embodiment, the calculation load can be reduced, which in turn provides a higher responsive performance, compared to the first embodiment in which a target torque τe is set from the basic target torques TRQ1, TRQ2 and TRQ3 and a target throttle opening-degree θe is set based on the target torque τe.

The relationship between an accelerator opening-degree θacc and a target throttle opening-degree θe at each mode of m1, m2 and m3 at a start and at a low vehicle speed is identical to those shown in FIG. 11A to FIG. 11C described above.

The present invention is not limited to the above described embodiments, and for example, two or four or more mode maps having different driving power performances map may be set. This allows a driver to enjoy driving of two or four or more vehicles which have different driving power performances in one vehicle, and in this case also, an excess torque or an insufficient torque at the start of a vehicle can be corrected by correcting a target throttle opening-degree θe from the start to a low vehicle speed driving range by using a correction factor map.

Moreover, the basic target torques TRQ1, TRQ2, and TRQ3 described in the first embodiment and the basic target throttle opening-degrees θα1, θα2, and θα3 described in the second embodiment may be calculated by using an accelerator opening-degree θacc and an engine speed Ne.

In the above embodiments, the throttle actuator 37 for driving a throttle valve mounted to an electronic controlled throttle device is controlled, but other component may be controlled instead of the throttle actuator 37, and for example in the case of a diesel engine, an injector driving apparatus is controlled so that an amount of a fuel injected by the injector driving apparatus may be set based on a target torque τe. Or in the case of an engine in which an intake valve is operated to open/close by an electromagnetic valve mechanism, the electromagnetic valve mechanism is controlled so that the position of the intake valve which is driven by the electromagnetic valve mechanism may be set based on a target torque τe.

Third Embodiment

FIGS. 15 to 26 show a third embodiment of the present invention.

Figure 15:
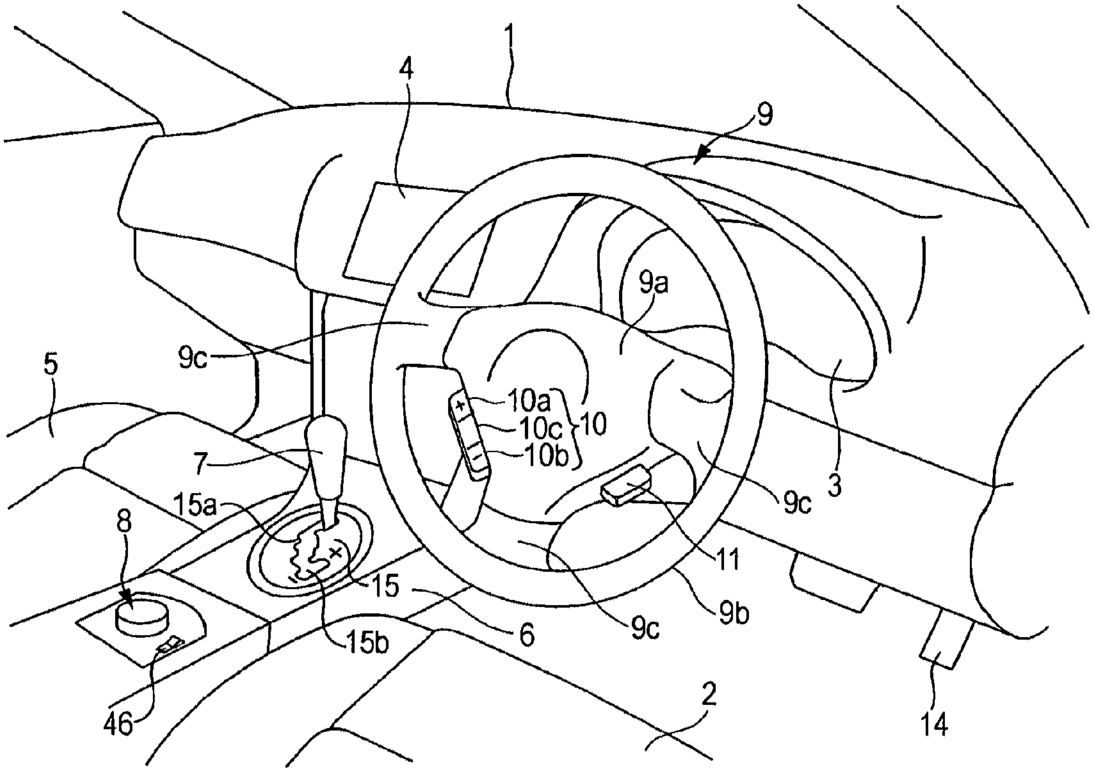
FIG. 15 is a perspective diagram showing an instrument panel and a center console of a third embodiment seen from a driver side.

As shown in FIG. 15, an instrument panel 1 is provided to a front part in a room of a vehicle and extends in the width direction of the vehicle. The instrument panel 1 has a combination meter 3 at a position in front of a driver's seat 2. The instrument panel 1 also has a center display 4 for a known car navigation system at a central position thereof.

A center console 6 is disposed between the driver's seat 2 and a passenger's seat 5 and extends from the instrument panel 1 side toward the rear part of the vehicle body. The center console 6 is provided with a select lever 7 for selecting an automatic transmission range, and a mode select switch 8 at the rear of the select lever 7 for mainly selecting a driving power performance of an engine of the vehicle. Furthermore, a control mode change switch 46 is provided at the side of the mode select switch 8.

A select gate 15 includes an automatic transmission gate 15*a* and a manual transmission gate 15*b*. The automatic transmission gate 15*a* has range positions for a parking (P) range, a reverse (R) range, a neutral (N) range, and a drive (D) range. The manual transmission gate 15*b* has an up position (+) at the top end and a down position (−) at the bottom end. When the select lever 7 is moved from the automatic transmission gate 15*a* to the manual transmission gate 15*b*, transmission characteristics of the automatic transmission are set to those of a sport mode. More specifically, transmission positions are shifted toward a high-rotational-speed side. Thus, in this state, the automatic transmission mode is maintained. Then, when the select lever 7 is moved to the up position (+) or the down position (−), the transmission mode is changed from the automatic transmission mode to the manual transmission mode.

A steering wheel 9 is further provided in front of the driver's seat 2. The steering wheel 9 has a center pad portion 9*a* for housing an air-bag therein, and the center pad portion 9*a* is coupled to right, left, and lower portions of an outer peripheral grip portion 9*b* via three spokes 9*c*. A display change-over switch 10 is mounted to the lower left portion of the center pad portion 9*a*, and a temporarily change-over switch 11 is mounted to the lower right portion of the center pad portion 9*a*.

Figure 16:
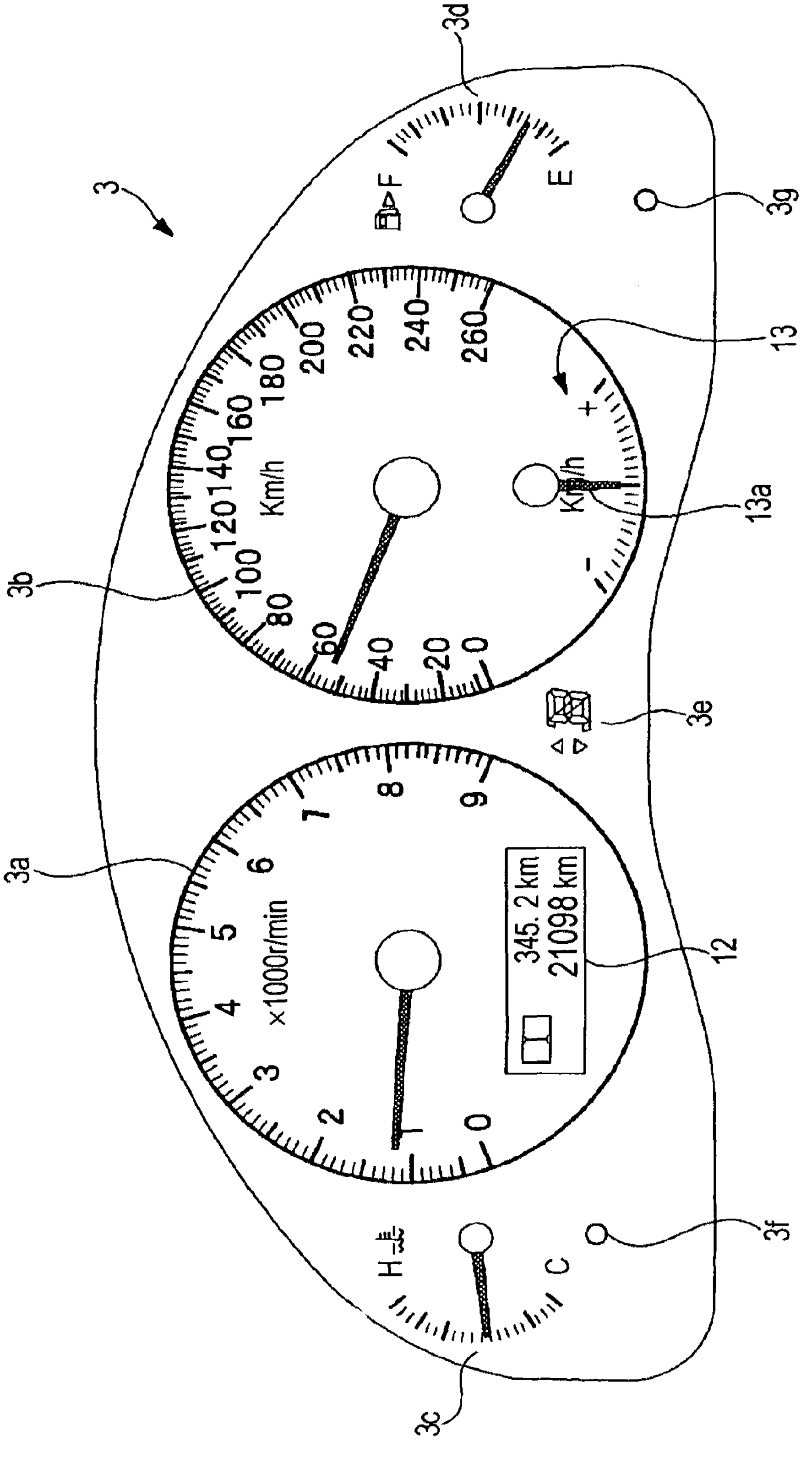
FIG. 16 is a front view of a combination meter of the third embodiment.

Further, as shown in FIG. 16, on left and right sides of the combination meter 3 close to the center, a tachometer 3*a* which indicates an engine rotational speed and a speed meter 3*b* which indicates a vehicle speed are respectively arranged. Further, a water temperature meter 3*c* which indicates a cooling water temperature is arranged on the left side of the tachometer 3*a*, and a fuel level meter 3*d* which indicates residual fuel quantity is arranged on the right side of the speed meter 3*b*. Further, a gearshift position display portion 3*e* which indicates a current position of gearshift is arranged on a center portion of the combination meter 3. Here, symbol 3*f* indicates a warning lamp, and symbol 3*g* indicates a trip reset switch which resets a trip meter. A push button of the trip reset switch 3*g* projects toward the driver's seat 2 side from the combination meter 3, and the trip meter is reset when the driver or the like continuously turns on the trip reset switch 3*g* for a predetermined time or more by pushing the push button.

Further, on a lower portion of the tachometer 3*a*, a multi information display (hereinafter, abbreviated as "MID") 12 which is used as a display means for respectively displaying information such as mileage, fuel consumption, the engine driving force by changing over a plurality of display images is arranged. Further, on a lower portion of the speed meter 3*b*, a fuel consumption meter 13 which indicates a state of fuel efficiency based on the difference between the instantaneous fuel consumption and the trip average fuel consumption is arranged.

Figure 17:
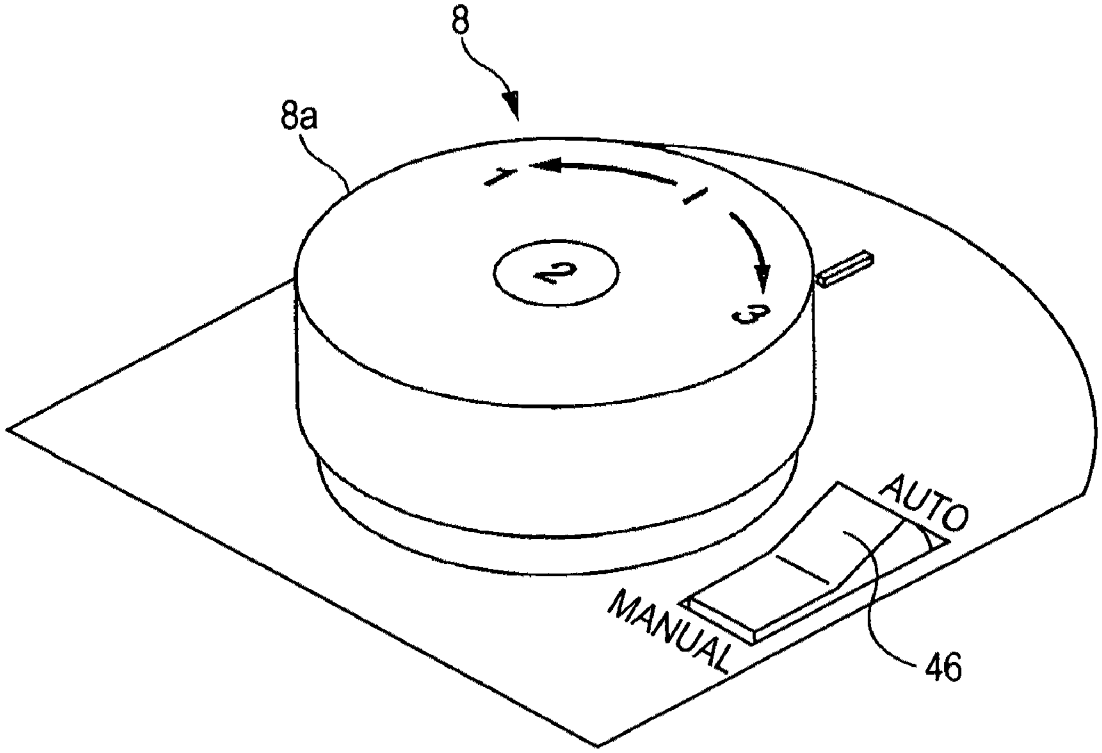
FIG. 17 is a perspective diagram of a mode select switch and a mode control change switch of the third embodiment.

As shown in FIG. 17, the mode control change switch 46 is a rocker switch. When the mode control change switch 46 is in the OFF state (MANUAL), a switch operation of the mode select switch 8, which will be described below, is enabled and engine-mode manual change control is executed. When the mode control change switch 46 is in the ON state (AUTO), the switch operation of the mode select switch 8 is disabled and engine-mode automatic change control is executed. In the engine-mode automatic change control, one of three kinds of engine output characteristics, which will be described below, is automatically selected in accordance with the driving state. The engine-mode manual change control may also be selected when the mode control change switch 46 is in the ON state while the engine-mode automatic change control is selected when the mode control change switch 46 is in the OFF state.

Further, as shown in FIG. 17, the mode select switch 8 is a shuttle switch which arranges a push switch parallel thereto. When an operator (since the operator is generally the driver, the explanation is made by referring the operator as "driver" hereinafter) manipulates an operation control knob 8*a*, the driver can select three kinds of modes described later (a normal mode m1 which is a first mode, a save mode m2 which is a second mode, and a power mode m3 which is a third mode). That is, in this embodiment, by rotating the manipulation knob 8*a* in the left direction, a left switch is turned on and the normal mode m1 is selected. By rotating the operation knob 8*a* in the right direction, a right switch is turned on and the power mode m3 is selected. On the other hand, by pushing the operation knob 8*a* in the lower direction, the push switch is turned on and the save mode m2 is selected. Here, by allocating the save mode m2 to the push switch, even when the push switch is turned on erroneously during traveling, for example, the mode is just changed over to the save mode m2 where an output torque is suppressed as described later, hence there is no possibility that the driving force is acutely increased thus ensuring the safe driving of the driver.

When the mode control change switch 46 is switched to the ON state, an engine control device (E/G_ECU) 22, which will be described below, executes the engine-mode automatic change control. In the engine-mode automatic change control, the engine mode is automatically switched on the basis of an engine operation state irrespective of the signal from the mode select switch 8.

Here, output characteristics of the respective modes m1 to m3 are briefly explained. The normal mode m1 is set such that an output torque is changed approximately linearly with respect to a operation amount of the accelerator pedal 14 (accelerator opening degrees) (see FIG. 26A). The normal mode m1 is a mode which is suitable for normal driving.

Further, the save mode m2 is set as a mode in which by saving an engine torque alone or by saving an engine torque in synchronism with a lock-up control in case of an automatic transmission, smooth output characteristic is obtained while ensuring a sufficient output thus allowing a driver to enjoy the acceleration work. Further, in the save mode m2, the output torque is suppressed and hence, it is possible to achieve both of the easy drive ability and low fuel consumption (economical efficiency) in a well balanced manner. Further, for example, even in case of a vehicle with a 3 litter engine, the smooth output characteristic is obtained while ensuring a sufficient output corresponding to the 2 litter engine. Particularly, the easy-to-drive performance is achieved in a practical-use region such as traveling in towns.

The power mode m3 is set as a mode in which the output characteristics with an excellent response from a low speed region to a high speed region of the engine is achieved and, at the same time, in case of an automatic transmission, a shift-up point is changed in accordance with engine torque, hence the vehicle can cope with a sporty or zippy driving on a winding load or the like. That is, in the power mode m3, the high response characteristic is set with respect to the operation amount of the accelerator pedal 14 and hence, in case of a vehicle with a 3 litter engine, for example, a maximum torque is generated at a lower operation amount of the accelerator pedal 14 such that a potential of the 3 litter engine can be exercised at maximum. Here, driving force indication values-(target torques) of the respective modes (normal mode m1, save mode m2, power mode m3) are, as described later, set based on 2 parameters consisting of an engine rotational speed and accelerator opening degrees.

Figure 18:
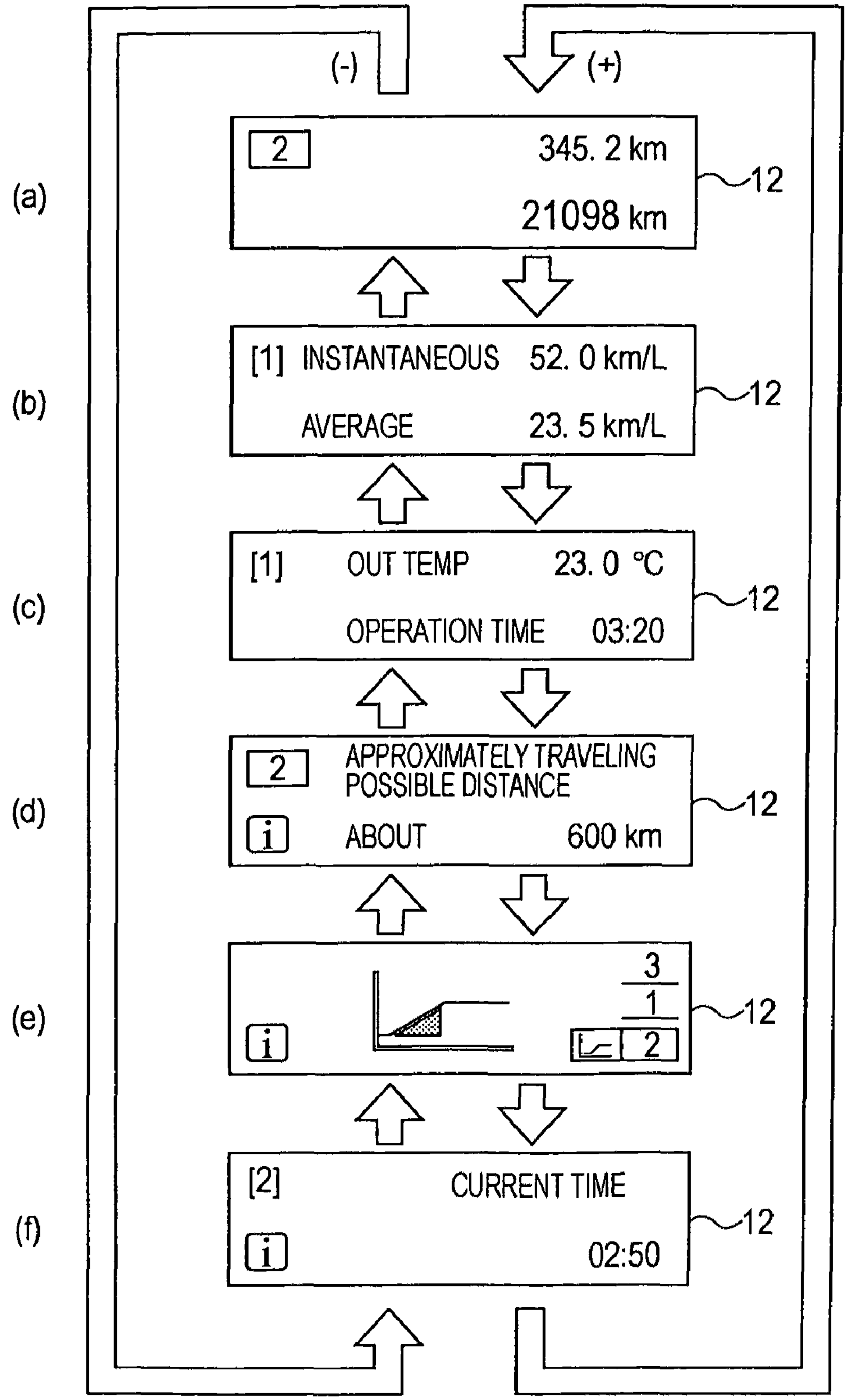
FIG. 18 is a diagram illustrating examples of a multi information display of the third embodiment.

A display changeover switch 10 is manipulated to change over information displayed on a MID 12 and includes a forward switch portion 10*a*, a backward switch portion 10*b*, and a reset switch portion 10*c*. FIG. 18 illustrates items for every images displayed on the MID 12 as an example. Here, the MID 12 may be a color display.

In this embodiment, 6 kinds of images (a) to (f) are set, wherein each time the forward switch portion 10*a* is turned on, the images are changed over in order from (a) to (f). When the forward switch portion 10*a* is turned on in a state that the image (f) is displayed, the initial image (a) is displayed. On the other hand, when the backward switch portion 10*b* is turned on, the image is changed over in the reverse direction.

The image (a) is an initial image which is displayed when the ignition switch is turned on. On the image (a), an odometer is displayed in a lower stage and a trip meter is displayed in an upper stage. Further, a current mode ("2" indicative of the save mode m2 in the drawing) is displayed at a left end of the image (a).

On the image (b), a mileage measured by the trip meter and a trip average fuel consumption [km/L] calculated based on a total fuel injection pulse width (pulse time) in the mileage are displayed in a lower stage, while a mileage during several seconds and an instantaneous fuel consumption [km/L] calculated based on the total fuel injection pulse width (pulse time) in the moment are displayed in an upper stage.

On the image (c), an operation time from a point of time that the engine is started is displayed in a lower stage and an outside temperature [° C.] is displayed in an upper stage.

On the image (d), an approximately traveling possible distance [Km] calculated based on residual fuel quantity in the inside of a fuel tank and the trip average fuel consumption is displayed.

On the image (e), an acceleration-torque line of the currently selected mode (the save mode m2 being indicated in the drawing) is displayed. In the acceleration-torque line, an output torque of the engine is taken on an axis of ordinates and the accelerator opening degrees is taken on an axis of abscissas, and a power display region P is set in the inside of the displayed acceleration-torque line. In the power display region P, being interlocked with the increase or the decrease of the accelerator opening degrees, the band showing the power level is linearly expanded or contracted in a transverse direction. Accordingly, by observing the displayed power level, the driver can easily grasp the current driving state.

The current time is displayed on the image (f).

Figure 19A:
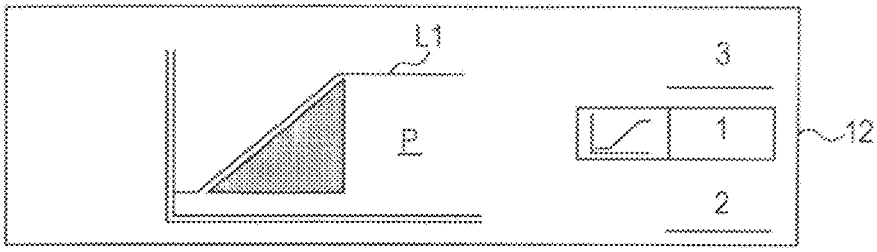
FIGS. 19A to 19C are diagrams illustrating examples of the multi information display of the third embodiment when a mode is switched.
Figure 19B:
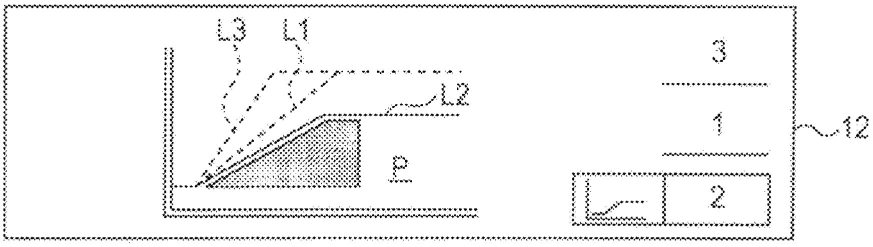
Figure 19C:
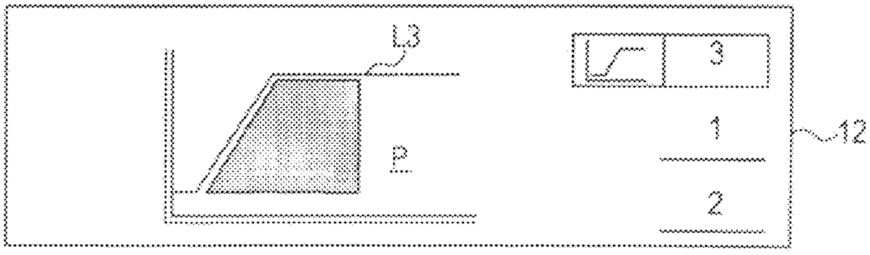

As shown in FIG. 19A to FIG. 19C, the above-mentioned acceleration-torque line displayed on the image (e) differs for every selected mode, that is, the normal mode m1, the save mode m2 or the power mode m3. FIG. 19(A) shows the acceleration-torque line L1 which constitutes a driving force characteristic line displayed when the normal mode m1 is selected. FIG. 19B shows the acceleration-torque line L2 which constitutes a driving force characteristic line displayed when the save mode m2 is selected. And FIG. 19C shows the acceleration-torque line L3 which constitutes a driving force characteristic line displayed when the power mode m3 is selected.

Here, the above-mentioned image (e) shown in FIG. 18 may be displayed on the MID 12 as an initial image when the ignition switch is turned on. In this case, immediately after the initial image is displayed, the respective acceleration-torque lines L1, L2, L3 are simultaneously displayed and, with a time delay, other acceleration-torque lines may be faded out while leaving only the acceleration-torque line corresponding to the currently set mode.

In FIG. 19B, to compare the driving force characteristics of the acceleration-torque lines L1, L2, L3 for respective modes, the acceleration-torque lines L1, L3 are indicated by a broken line in an overlapped manner. Here, these acceleration-torque lines L1, L3 are indicated for the conveniences sake and are not displayed in an actual operation. As shown in FIG. 19B, the power mode m3 possesses the characteristic which exhibits a larger throttle change quantity in response to a step-on operation of the accelerator pedal. Here, a larger target torque is set with respect to the accelerator opening degrees. The normal mode m1 is set to possess the characteristic where the throttle opening is linearly arranged with respect to the operation amount of the accelerator pedal. Compared to the driving force characteristic of the power mode m3, the normal mode m1 possesses the characteristic which exhibits the relatively small throttle change quantity in response to the step-on operation of the accelerator pedal. That is, the normal mode m1 is set to acquire the favorable driving performance in a usual driving region where the accelerator opening degrees is relatively small.

Further, the save mode m2 is set such that the driver can enjoy the acceleration work with the smooth output characteristic while ensuring a sufficient output.

Here, the content displayed in FIG. 19A to FIG. 19C (the image shown in FIG. 18(*e*)) may be always displayed on an information display which is separately provided in the inside of the tachometer 3*a*. Alternatively, only the display content shown in FIG. 19A to FIG. 19C is displayed on the MID 12 and other display contents shown in FIG. 18 may be displayed on an information display which is additionally provided.

Further, in the fuel consumption meter 13, a neutral position indicates the trip average fuel consumption [Km/L]. When the instantaneous fuel consumption [Km/L] is higher than the trip average fuel consumption [Km/L], a pointer 13*a* is swung in the plus (+) direction in response to the deviation, while when the instantaneous fuel consumption [Km/L] is lower than the trip average fuel consumption [Km/L], the pointer 13*a* is swung in the minus (−) direction in response to the deviation.

Figure 20:
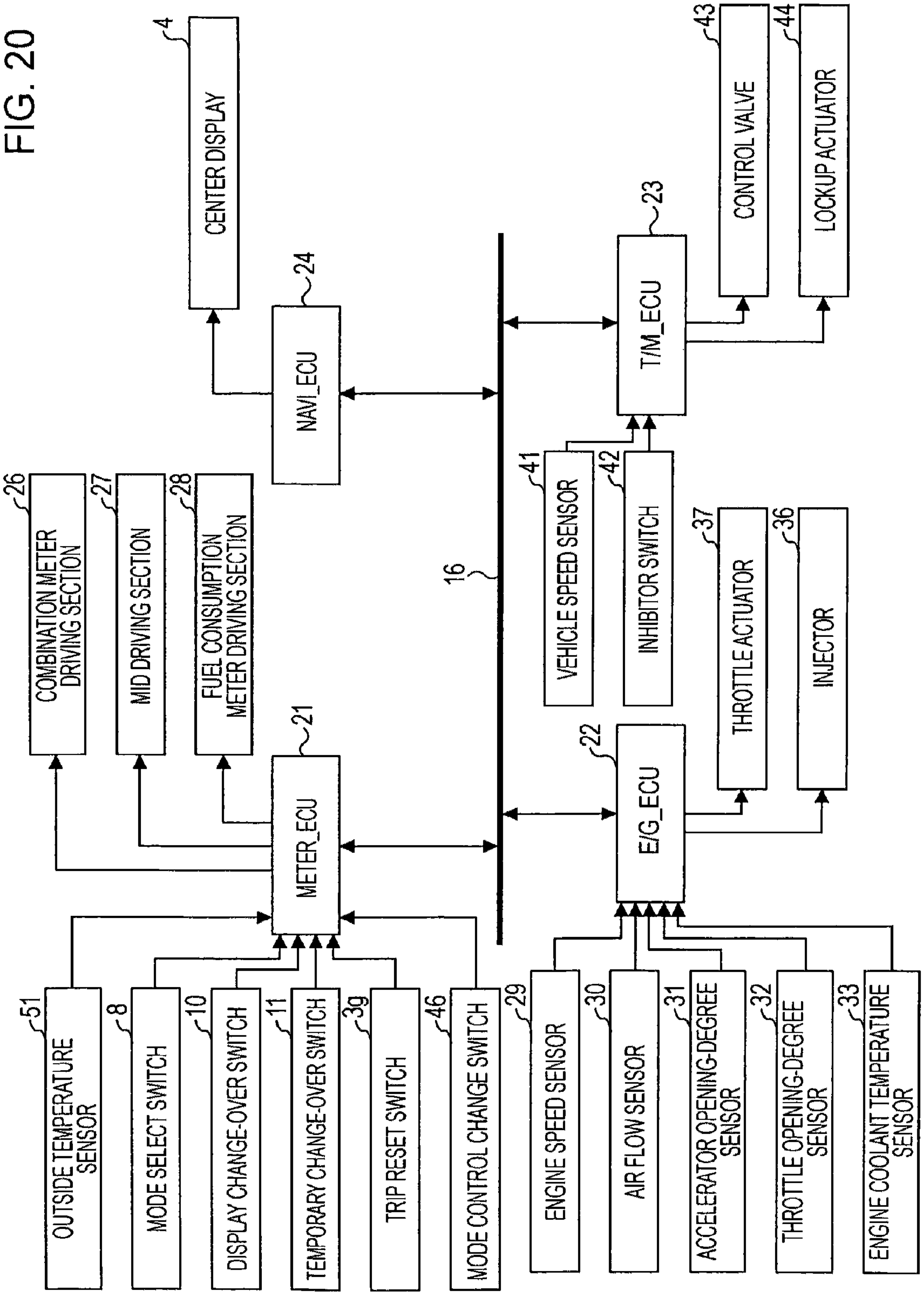
FIG. 20 is a block diagram showing the structure of an engine control apparatus.

Here, as shown in FIG. 20, to the vehicle, through an interior communication circuit 16 such as a CAN (Controller Area Network) communication, control devices which constitutes arithmetic operation means for controlling the vehicle such as a meter control device (meter_ECU) 21, an engine control device (E/G_ECU) 22, a transmission control device (T/M ECU) 23, a navigation control device (navigation-_ECU) 24 are connected in an intercommunicable manner. Each one of the ECU 21 to 24 is mainly constituted of a computer such as a microcomputer and includes well-known CPU, ROM, RAM and a non-volatile memory means such as EEPROM.

The meter_ECU 21 is provided for controlling the whole display of the combination meter 3. Here, the mode select switch 8, the display changeover switch 10, a temporary changeover switch 11 and the trip reset switch 3*g* are connected to an input side of the meter_ECU 21, while instruments such as the tachometer 3*a*, the speed meter 3*b*, the water temperature meter 3*c*, the fuel meter 3*d*, a combination meter drive part 26 which drives the warning lamp 3*f*, an MID drive part 27, and a fuel meter drive part 28 are connected to an output side of the meter_ECU 21.

The E/G_ECU 22 is provided for controlling an operation state of the engine. To an input side of the E/G_ECU 22, a group of sensors which detect the vehicle and engine operation states such as an engine rotational speed sensor 29 which constitutes an operation state detection means for detecting an engine rotational speed which is a typical example of parameters indicating the engine operation state based on a rotation of a crankshaft or the like, an intake air quantity sensor 30 which is arranged immediately downstream of an air cleaner or the like and detects the intake air quantity, an accelerator opening sensor 31 which constitutes an accelerator opening detection means for detecting accelerator opening degrees of the accelerator pedal 14, a throttle opening sensor 32 which is interposed in an intake passage and detects opening of a throttle valve (not shown in the drawing) for adjusting an intake air quantity supplied to respective cylinders of the engine, a water temperature sensor 33 which constitutes an engine temperature detection means for detecting cooling water temperature indicative of an engine temperature are connected. Further, to an output side of the E/G_ECU 22, a group of actuators which controls the driving of the engine such as an injector 36 which injects a predetermined measured fuel to a combustion chamber, a throttle actuator 37 which is mounted in an electronic throttle control device (not shown in the drawing) are connected.

The E/G_ECU 22 sets fuel injection timing and a fuel injection pulse width (pulse time) with respect to the injector 36 based on inputted detection signals from the respective sensors. Further, E/G_ECU 22 outputs the throttle driving signal to the throttle actuator 37 which drives the throttle valve thus controlling the opening of the throttle valve.

Figure 26A:
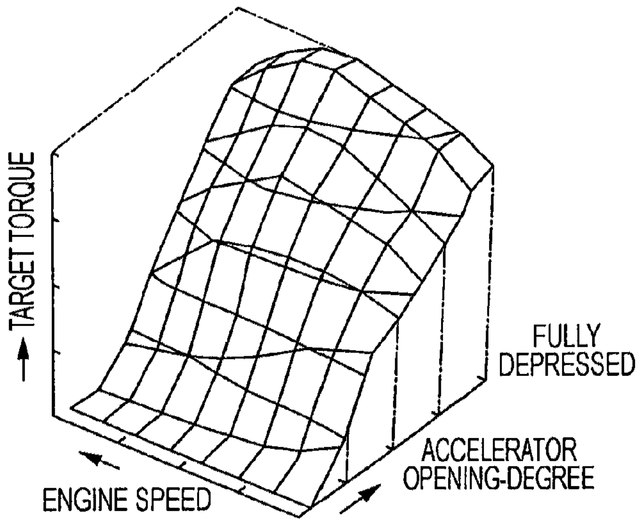
FIG. 26A is a conceptual diagram showing a normal mode map.
Figure 26B:
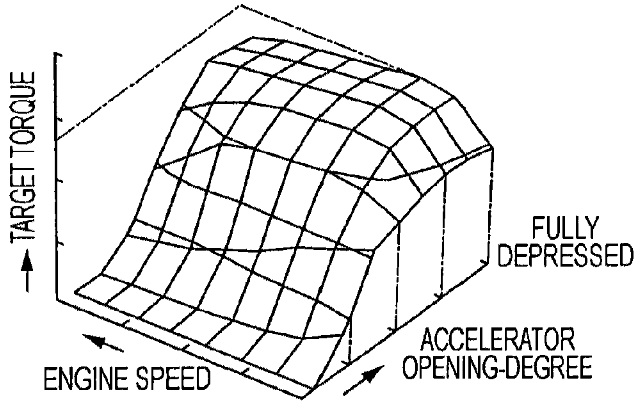
FIG. 26B is a conceptual diagram showing a save mode map.
Figure 26C:
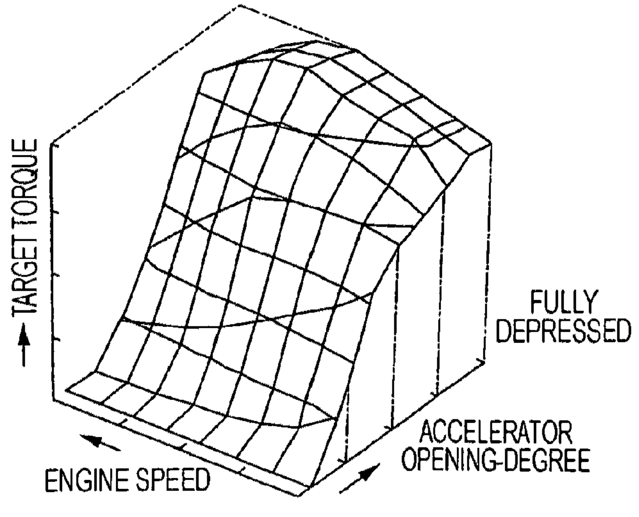
FIG. 26C is a conceptual diagram showing a power mode map.

Here, in the volatile memory means which is provided to the E/G_ECU 22 and constitutes a portion of the driving force setting means, a plurality of different driving force characteristics is stored in a map form. As the respective driving force characteristics, in this embodiment, three kinds of mode maps Mp1, Mp2, Mp3 are provided. As shown in FIG. 26A to FIG. 26C, the respective mode maps Mp1, Mp2, Mp3 are configured as a three-dimensional map in which the accelerator opening degrees and the engine rotational speed are taken on matrix axes, and driving force indication values (target torques) are stored in respective matrix points.

The respective mode maps Mp1, Mp2, Mp3 are basically selected by the manipulation of the mode select switch 8. That is, when the normal mode m1 is selected by the mode select switch 8, the normal mode map Mp1 which constitutes the first mode map is selected. When the save mode m2 is selected by the mode select switch 8, the save mode map Mp2 which constitutes the second mode map is selected. Further, when the power mode m3 is selected by the mode select switch 8, the power mode map Mp3 which constitutes the third mode map is selected.

Hereinafter, the driving force characteristics of the respective mode maps Mp1, Mp2, Mp3 are explained. The normal mode map Mp1 shown in FIG. 26A is set to exhibit the characteristic in which the target torque is linearly changed in a region where the accelerator opening degrees is relatively small, and the maximum target torque is obtained when the opening of the throttle valve is close to a wide-open throttle.

Further, in the save mode map Mp2 shown in FIG. 26B, compared to the above-mentioned normal mode map Mp1, the elevation of the target torque is suppressed and hence, the driver can enjoy the acceleration work by widely using the stroke of the accelerator pedal 14. Further, since the elevation of the target torque is suppressed, it is possible to achieve both of the easy drive ability and the low fuel consumption in a well balanced manner. For example, in case of a vehicle with a 3 litter engine, the smooth output characteristic is obtained while ensuring a sufficient output corresponding to the 2 litter engine. Particularly, the target torque is set to achieve easy-to-drive performance in a practical-use region such as traveling in towns.

Further, in the power mode map Mp3 shown in FIG. 26C, a change rate of the target torque in response to the change of the accelerator opening degrees is largely set in the substantially all driving region. Accordingly, for example, in case of a vehicle with a 3 litter engine, the target torque is arranged to maximize potential of the 3 litter engine. Here, the substantially same driving force characteristic is set in a low speed region including an idling rotational speed in the respective mode maps Mp1, Mp2, Mp3.

In this manner, in the case the mode change switch 46 is in the OFF state, according to this embodiment, when any one of the modes m1, m2, m3 is selected in response to the manipulation of the mode select switch 8 by the driver, the corresponding mode map Mp1, Mp2 or Mp3 is selected, and the target torque is set based on the mode map Mp1, Mp2 or Mp3 and hence, the driver can enjoy three kinds of acceleration responses which differ completely from each other using one vehicle.

Further, the T/M_ECU 23 is provided for performing the gear change control of the automatic transmission. To an input side of the T/M_ECU 23, a vehicle speed sensor 41 which detects a vehicle speed based on a rotational speed of a transmission output shaft or the like, an inhibitor switch 42 which detects a range in which the select lever 7 is positioned are connected, while to an output side of the T/M_ECU 23, a control valve 43 which performs the gear change control of the automatic transmission and a lock-up actuator 44 which performs a lock-up operation of a lock-up clutch are connected. The T/M_ECU 23 determines the range of the select lever 7 in response to a signal from the inhibitor switch 42. When the select lever 7 is positioned in a D range, the T/M_ECU 23 performs the change gear control by outputting a change gear signal to the control valve 43 in accordance with a predetermined transmission pattern. Here, the transmission pattern is variably set corresponding to the modes m1, m2, m3 set in the E/G_ECU 22.

Further, when the lock-up condition is satisfied, a slip lock-up signal or a lock-up signal is outputted to the lock-up actuator 44 so as to changeover the relationship between input/output elements of a torque converter into a slip lock-up state or a lock-up state from a converter state. Here, the E/G_ECU 22 corrects the target torque τe when the state of the torque converter is changed to a slip lock-up state or a lock-up state. As a result, for example, when the mode M is set to the save mode m2, the target torque τe is corrected to the one which allows more fuel efficient traveling.

The navigation_ECU 24 is mounted in a well-known car navigation system, and detects a position of the vehicle based on positional data obtained from a GPS satellite or the like and, at the same time, calculates a guide route to the destination. Further, the navigation_ECU 24 displays the present position and the guide route of the own car as the map data on the center display 4. In this embodiment, the navigation_ECU 24 can display various information to be displayed on the MID 12 on the center display 4.

Next, steps for controlling the operation state of the engine executed by the above-mentioned E/G_ECU 22 is explained in accordance with flowcharts shown in FIG. 4, 5, 21 to 25

When the ignition switch is turned on, first of all, the start-up time control routine shown in FIG. 4 is initiated only one time. In this routine, first of all, in step S1, the mode M (M: normal mode m1, save mode m2, power mode m3) stored the last time the ignition switch was turned off is read.

Then, the program goes to step S2, and it is determined whether the mode M is the power mode m3 or not. When the mode M is the power mode m3, the mode M is forcibly set to the normal mode m1 (M←mode m1) and the routine is finished.

Further, when the mode M is the mode other than the power mode m3, that is, the normal mode m1 or the save mode m2, the routine is finished as it is.

In this manner, when the mode M stored the last time the ignition switch was turned off is the power mode m3, the mode M at the time of turning on the ignition switch is forcibly changed to the normal mode m1 (M+mode m1), hence there is no possibility that the vehicle starts rapidly and, thus, the vehicle can obtain the favorable start performance even when the accelerator pedal 14 is slightly depressed.

Figure 21:
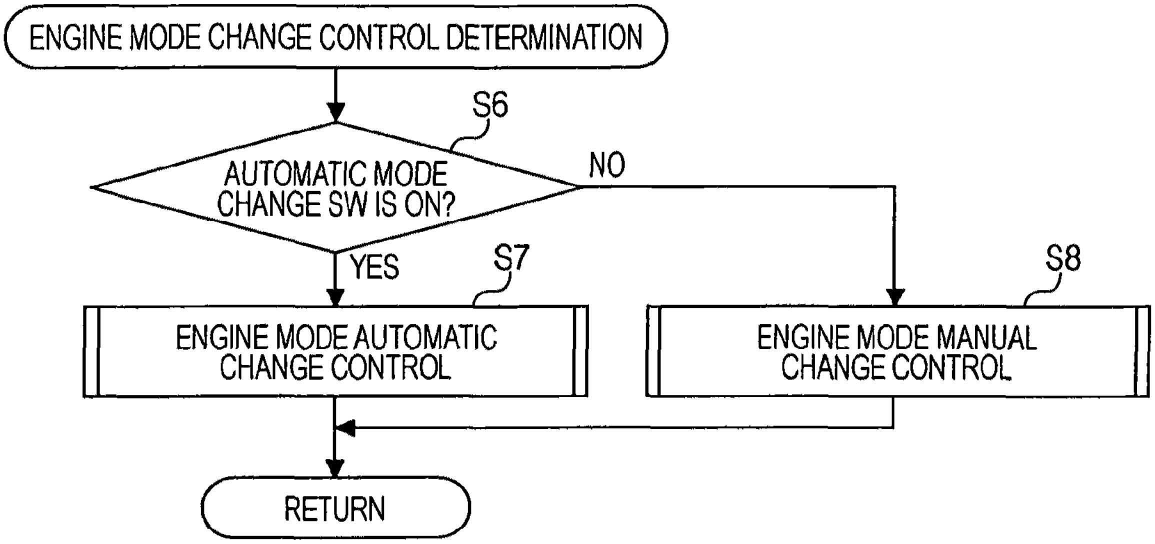
FIG. 21 is a flowchart illustrating an engine-mode change control determination routine of the third embodiment.

After the start-up time control routine is finished, an engine-mode change control determination routine shown in FIG. 21 is repeatedly executed at a predetermined operation period. In this routine, first, in step S6, the state of the mode control change switch 46 is checked. If the mode control change switch 46 is in the ON state, the program goes to step S7, where the engine-mode automatic change control is performed, and the routine is finished. If the mode control change switch 46 is in the OFF state, the program goes to step S8, where the engine-mode manual change control is performed, and the routine is finished. In the engine-mode manual change control performed in step S8, the mode selected by the mode control change switch 8 (one of modes 1, 2, and 3) is read. The processes performed in step S7 and S8 correspond to the selecting means for selecting one of the modes m1, m2, and m3.

Figure 22:
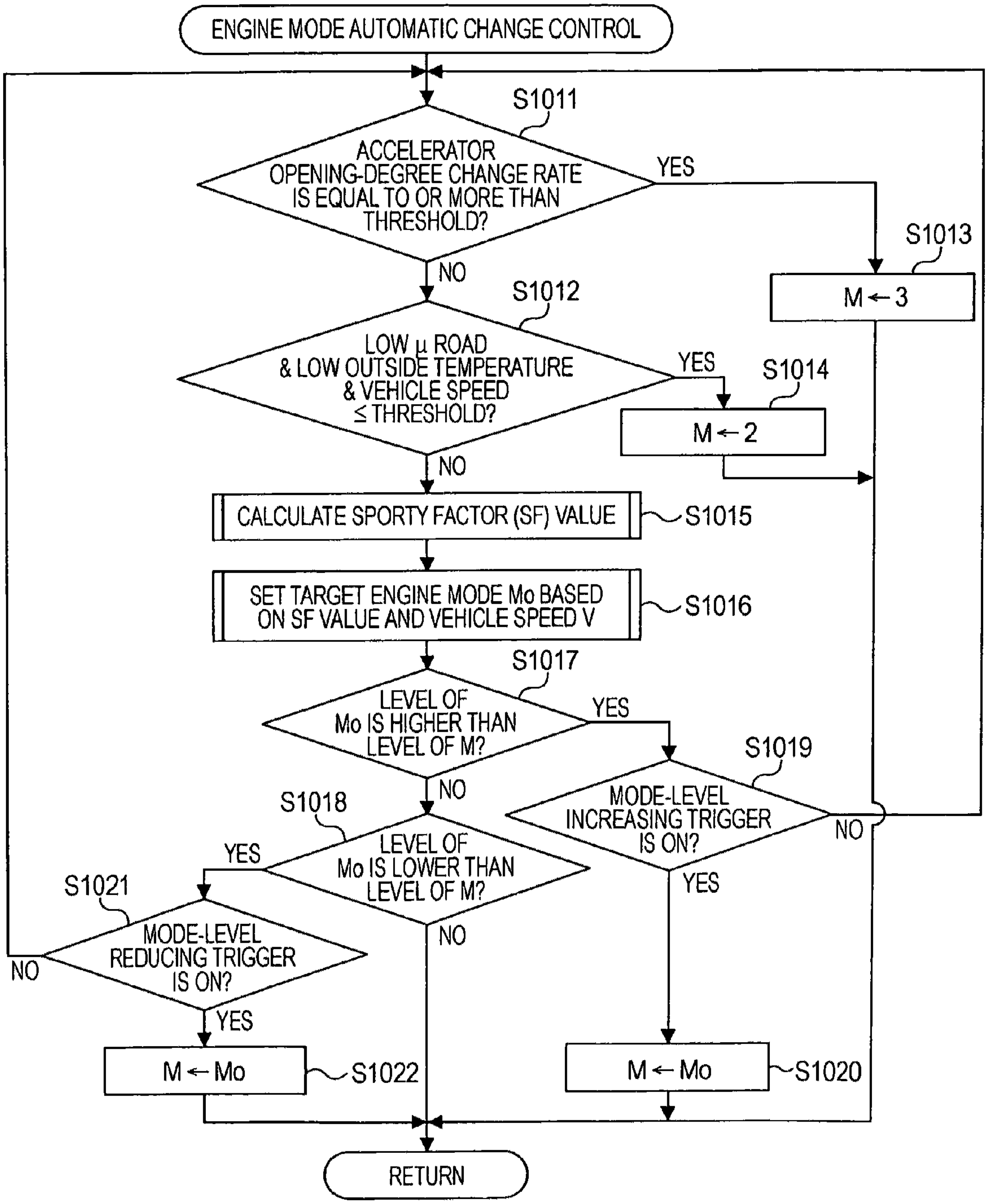
FIG. 22 is a flowchart illustrating an engine-mode automatic change control routine of the third embodiment.

In the engine-mode automatic change control performed in step S7, an engine-mode automatic change control routine shown in FIG. 22 is executed.

In this routine, first, in step S1011, an accelerator opening-degree change rate is determined from a change per unit time of the accelerator opening-degree detected by the accelerator opening-degree sensor 31. Then, it is determined whether or not the accelerator opening-degree change rate is equal to or higher than a rapid-acceleration determination threshold. If (accelerator opening-degree change rate)<(rapid-acceleration determination threshold) is satisfied, rapid acceleration is not required. Thus, the program goes to step S1012. If (accelerator opening-degree change rate)≧(rapid-acceleration determination threshold) is satisfied, it is determined that the driver has requested a temporal increase in the driving force to make, for example, a rapid acceleration. Thus, the program branches to step S1013, where the engine mode M is set to the power mode m3 (M+3), and the routine is finished. Then, if, for example, the accelerator pedal is released and the accelerator opening-degree change rate is reduced to below the rapid-acceleration determination threshold, the program goes from step S1011 to step S1012 in the next operation cycle. Therefore, if the save mode m2 or the normal mode m1 is being selected, the program performed in step S1013 functions as temporal mode switch control.

In step S1012, parameters (road μ and outside temperature Tg) indicating road conditions and the vehicle speed V detected by the vehicle speed sensor 41 are checked. If the road μ and the outside temperature Tg are low and the vehicle speed V is equal to or lower than a low-speed determination threshold, the program branches to step S1014, where the engine mode M is set to the save mode m2 (M←2), and the routine is finished. As a result, high traction performance can be provided in the case of starting the vehicle on low-μ roads or driving on snowy roads.

On the other hand, if the result of the determination performed in step S1012 is NO, the program goes to step S1015. In step S1015 and the following steps, steady mode change control is performed. First, in step S1015, a sporty factor (SF) is calculated from the weighted average as follows:

$$SF \leftarrow (1 \cdot a) \cdot SF(n \cdot 1) + a \cdot SF(n)$$

wherein SF(n) is the sum of S values (SF(n)←ΣS). The S values are determined in conjunction with events indicating the driving conditions and the driving style of the driver, and are obtained by setting parameters for the respective events and substituting the parameters into relational expressions or referring to maps on the basis of the parameters. SF(n·1) is the SF value calculated the last time and a is a weight constant (0<a<1) for calculating the weighted average.

The S values determined in conjunction with the above-mentioned events include, for example, the degree of ascent or descent of the road, the degree of usage of high engine speeds, the degree of winding of the road, the degree of acceleration or deceleration, the degree of operation of the accelerator, and the degree of experience of the manual transmission mode. The degree of ascent or descent of the road is determined on the basis of the driving force and the engine torque. The degree of usage of high engine speeds is determined on the basis of the engine speed. The degree of winding of the road is determined by a transverse acceleration, a steering angle, or a combination of a difference in rotation between the left and right wheels and the vehicle speed V. The degree of acceleration or deceleration is determined on the basis of a combination of the acceleration or deceleration and the vehicle speed. The degree of operation of the accelerator is determined on the basis of the accelerator opening-degree and the vehicle speed. The degree of experience of the manual transmission mode is the number of times the manual transmission mode has been selected per unit distance. The S values are expressed in terms of points, and are set to values corresponding to the degrees of the respective events. The S values may also include the load determined on the basis of the accelerator opening-degree change rate and the vehicle speed at the time when the vehicle starts, the traffic-jam determination value determined on the basis of the ratio of the driving time to the stoppage time per unit distance while the vehicle speed is low, etc. The SF value is cleared when the ignition switch is switched to the ON state (SF←0). Thus, the SF value is continuously calculated during a time period from when the ignition switch is turned on to when the ignition switch is turned off. The parameters used to calculate the S values correspond to driving-state detection means for detecting the driving state.

The above-described SF value may also be set to the largest one of the weighted averages of the S values or to the sum of the weighted averages of the S values.

Figure 23:
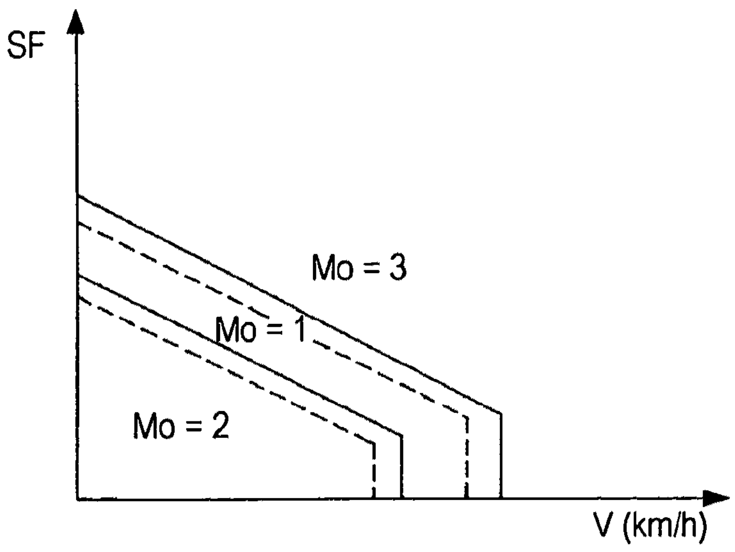
FIG. 23 is a conceptual diagram of a target engine mode map.

Then, the program goes to step S1016, where the target engine mode Mo is set on the basis of the SF value and the vehicle speed V by referring to a mode area map and performing interpolation calculation. FIG. 23 is a conceptual diagram of the mode area map. As shown in FIG. 23, in an area where the SF value and the vehicle speed V are both low, the save mode m2 in which economic running is possible is set because the required driving force is low. In an area where at least one of the SF value and the vehicle speed V is high, the power mode m3 is set because the required driving force is high. In an intermediate area between the above-mentioned areas, the normal mode m1 is set. The solid lines show the thresholds used when the selected mode is changed from a low-level mode to a high-level mode (m2→m1, m1→m3), and the dashed lines show the thresholds used when the selected mode is changed from a high-level mode to a low-level mode (m3→m1, m1→m2). Since the thresholds are set to have hysteresis, control hunting, which occurs due to switching of the engine mode in areas near the thresholds, can be prevented.

Then, the program goes to step S1017, where the current engine mode M is compared with the target engine mode Mo set by referring to the map. If the current engine mode M and the target engine mode Mo are the same, or when the level of the target engine mode Mo is lower than that of the current engine mode M, the program goes to step S1018. If the level of the target engine mode Mo is higher than that of the current engine mode M, the program branches to step S1019.

In step S1019, it is determined whether or not a mode-level-increasing trigger signal for changing the current mode to a mode with a higher level is in the ON state. If the mode-level-increasing trigger signal is in the ON state, the program goes to step S1020. If the mode-level-increasing trigger signal is in the OFF state, the program returns to step S1011, and the calculation of the SF value is repeated. The mode-level-increasing trigger signal is set to the ON state when the driving conditions are such that, for example, a torque increase request is issued by the driver. The torque increase request is issued by the driver when, for example, a down-shift signal is output from the T/M_ECU 23. The torque increase request may also be issued when the accelerator opening-degree sensor 31 or an accelerator pedal switch detects that the accelerator pedal has been released. More specifically, in the high-load driving state, for example, in the state in which the vehicle drives on an ascending road, there may be a case in which the driver feels the torque is insufficient even when the accelerator pedal is depressed. In such a case, the driver may release the accelerator pedal once, and then depress the accelerator pedal again. In this case, the mode-level-increasing trigger signal is switched to the ON state when the accelerator pedal is released.

Then, if it is determined that the mode-level-increasing trigger signal is in the ON state, the program goes to step S1020, where the engine mode M is set to the target engine mode Mo (M←Mo), and the routine is finished.

If the program goes to step S1018, it is determined whether or not the level of the target engine mode Mo is lower than that of the current engine mode M. If the level of the target engine mode Mo is lower than that of the current engine mode M, the program branches to step S1021. If the current engine mode M and the target engine mode Mo are the same, the routine is finished. In step S1021, it is determined whether or not the mode-level-reducing trigger signal for changing the current mode to a mode with a lower level is in the ON state. If it is determined that the mode-level-reducing trigger signal is in the ON state, the program goes to step S1022. If the mode-level-reducing trigger signal is in the OFF state, the process returns to step S1011 and the calculation of the SF value is repeated. The mode-level-reducing trigger signal is set to the ON state when the driving conditions are such that, for example, a torque reduction request is issued by the driver. The torque reduction request is issued by the driver when, for example, the accelerator opening-degree sensor 31 or an accelerator pedal switch detects that the accelerator pedal has been released while the vehicle is in a low-load driving state, for example, while the vehicle drives on a descending road.

If it is determined that the mode-level-reducing trigger signal is in the ON state, the program goes to step S1022, where the engine mode M is set to the target engine mode Mo (M←Mo), and the routine is finished.

In the steady mode change control performed in steps S1015 to S1022, the weighted averages of the S values are determined. The S values indicate the respective events that correspond to the driving conditions and the driving style of the driver. Therefore, the steady mode change control that is adequate for the driving conditions and the driving style of the driver can be performed.

In addition, in the steady mode change control, the engine mode is not switched until the mode-level-increasing trigger signal or the mode-level-reducing trigger signal is detected, and the SF value is continuously calculated after the engine mode is changed. Therefore, the engine mode is prevented from being switched frequently. As a result, the engine mode corresponding to the driving conditions and the driving style of the driver can be automatically set.

When the driving conditions are such that the required driving force is increased, for example, when rapid acceleration is required, the engine mode M is temporarily switched to the power mode m3. Therefore, the engine mode can be switched to a mode that more accurately corresponds to the driver's intention. In addition, the engine mode M is set to the save mode m2 when the road 11 is low. Therefore, the traction performance can be automatically ensured in the case of driving on snowy roads or the like.

According to the present embodiment, the engine mode M can not only be selected from the modes m1, m2, and m3 by the driver but also be switched automatically. In the engine-mode automatic change control, the mode corresponding to the driving conditions and the driving style of the driver is continuously set as the engine mode M. Therefore, excellent driving performance can be achieved without a feeling of excess or insufficient torque.

The engine mode M set in step S8 in FIG. 21, step S1020 in FIG. 22, or step S1022 in FIG. 22 is read in the mode map selection routine shown in FIG. 5.

In this routine, first of all, it is determined which mode (normal mode m1, save mode m2 or power mode m3) is set by reference to the number of the mode M in step S11. Then, when set is the normal mode m1, the program goes to step S13. When set is the save mode m2, the program is branched to step S14. Further, when set is the power mode m3, the program is branched to step S15. Here, at the time of executing the first routine after the ignition switch is turned on, the mode M is either one of the normal mode m1 or the save mode m2 and hence, the program is not branched in step S15. However, when the driver rotates the operation control knob 8*a* of the mode select switch 8 in the right direction after the ignition switch is turned on to select the power S# mode, the mode M is set to the power mode m3 in step S23 described later and hence, the program is branched to step S15 from step S12 at the time of executing succeeding routine.

Then, when it is determined that the mode M is set to the normal mode m1 and the program goes to step S13, the normal mode map Mp1 stored in the non-volatile memory means of the E/G_ECU 22 is set as the mode map of this time and the program goes to step S19. Further, when it is determined that the mode M is set to the save mode m2 and the program goes to step S14, the save mode map Mp2 is set as the mode map of this time and the program goes to step S19.

On the other hand, when it is determined that the mode M is set to the power mode m3 and the program is branched to step S15, in steps S15 and S16, a cooling water temperature Tw detected by the water temperature sensor 33 as the engine temperature is compared with a predetermined lower temperature as a warm-up determination temperature TL and a predetermined upper temperature as an over heat determination temperature TH. Then, when it is determined that the cooling water temperature Tw is equal to or above the warm-up determination temperature TL (Tw≧TL) in step S15 and when it is determined that the cooling water temperature Tw is below the over heat determination temperature TH (Tw<TH) in step S16, the program goes to step S17.

On the other hand, when it is determined that the cooling water temperature Tw is below the warm-up determination temperature TL (Tw<TH) in step S15 or when it is determined that the cooling water temperature Tw is equal to or above the over heat determination temperature TH (Tw>TH) in step S16, the program is branched to step S18 and the mode M is set to normal mode m1 (M←mode m1) and the program returns to step S13.

In this manner, according to this embodiment, even when the driver manipulates the mode select switch 8 to select the power mode m3 after the ignition switch is turned on, the mode M is forcibly made to return to the normal mode m1 in the event that the cooling water temperature Tw is equal to or below the warm-up determination temperature TL or equal to or above the over heat determination temperature TH. Accordingly, a discharge quantity of exhaust emission can be suppressed at the time of engine warm-up, and the engine and its peripheral equipment can be protected from a heat defect by suppressing the output at the time of over heat. Here, when the mode M is forcibly made to return to the normal mode m1, the warning lamp 3*f* is turned on or blinked to inform the driver that the mode M is forcibly made to return to the normal mode m1. In this case, the return of the mode M to the normal mode m1 may be notified by a buzzer or sounds.

Next, when the program goes to step S19 from any one of steps S13, S14 and S17, it is determined whether the mode select switch 8 is manipulated or not. When it is determined that the manipulation of the mode select switch 8 is not performed, the routine is finished. Further, when it is determined that the manipulation of the mode select switch 8 is performed, the program goes to step S20 and it is determined which mode is selected by the driver.

Then, when it is determined that the driver selects the normal mode (the operation control knob 8*a* being rotated in the left direction), the program goes to step S21 to set the mode M to the normal mode m1 (M←mode m1), and the routine is finished. Further, when it is determined that the driver selects the save mode m2 (the knob operation control 8*a* being pushed) (M←mode m2), the program goes to step S21 to set the mode M to the save mode m2 (M←mode m2), and the routine is finished. Further, when it is determined that the driver selects the power mode m3 (the operation control knob 8*a* being rotated in the right direction), the processing advances to step S23 to set mode M to the power mode m3 (M←mode m3), and the routine is finished.

In the present embodiment, after the ignition switch is turned on, the engine mode M can be set to the power mode m3 by operating the operation control knob 8*a* of the mode select switch 8 while the mode control change switch 46 is in the OFF state. However, in such a case, the power mode m3 is intentionally selected by the driver. Therefore, the driver will not be surprised even when a large engine output is provided when the vehicle is started.

Figure 24:
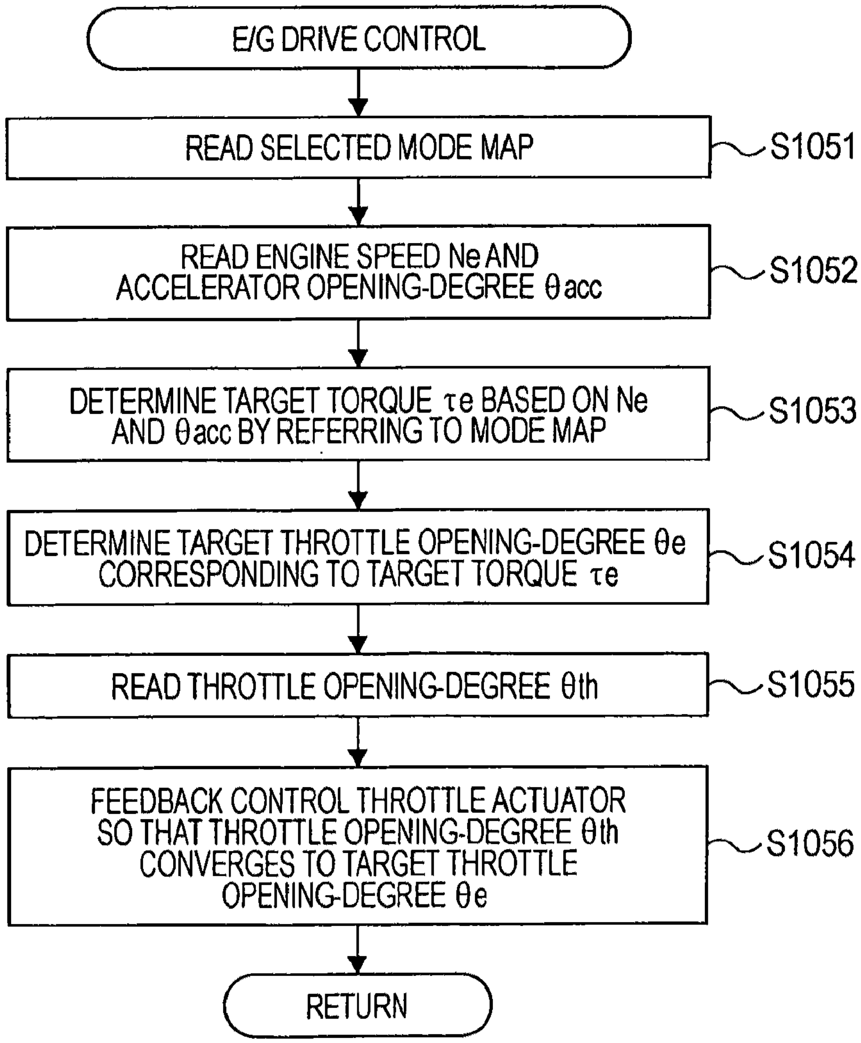
FIG. 24 is a flowchart illustrating an engine control routine.
Figure 25:
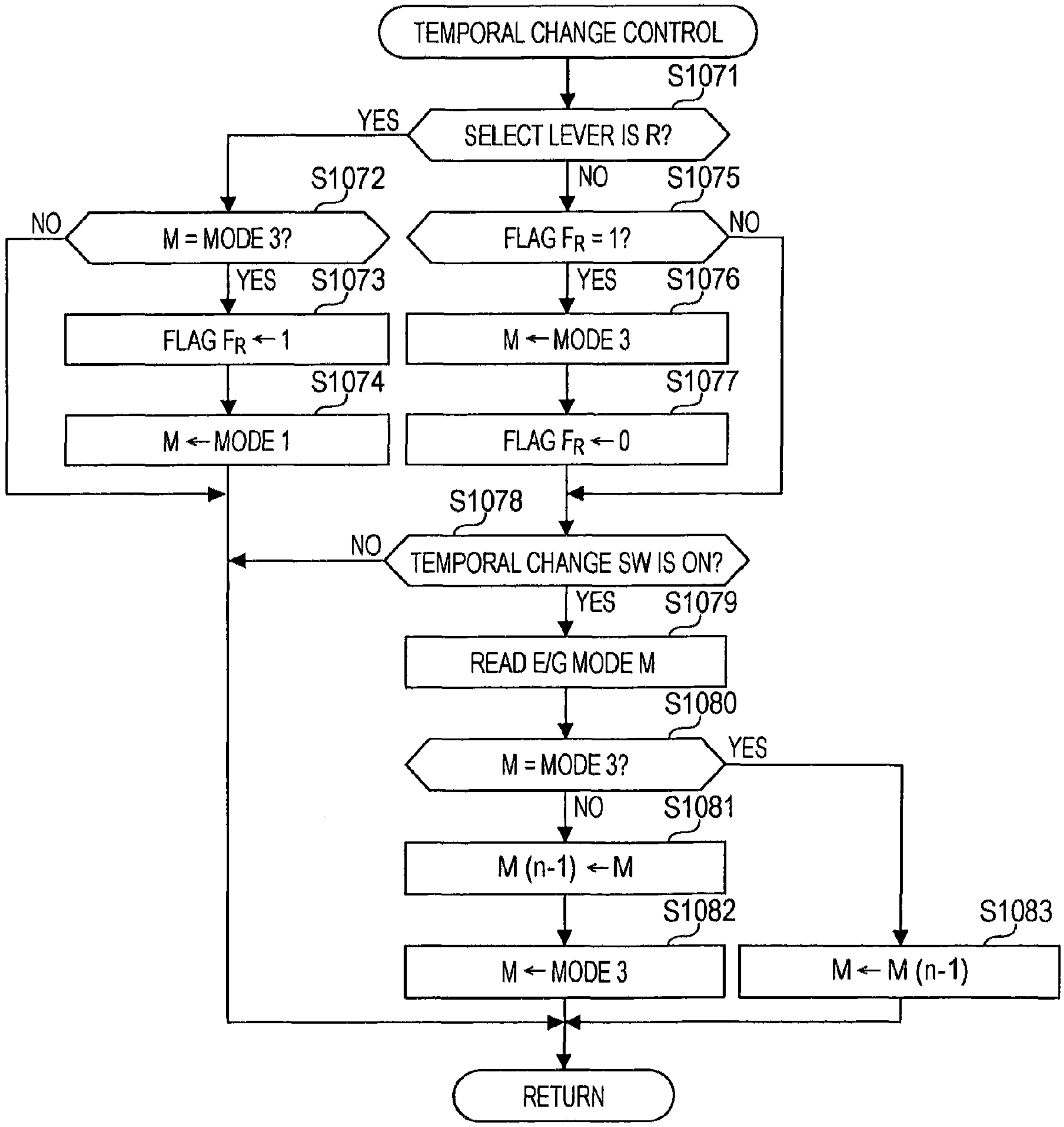
FIG. 25 is a flowchart illustrating a temporal change control routine.

Next, an engine control routine shown in FIG. 24 is explained.

In this routine, first of all, in step S1051, the currently selected mode map (Mp1, Mp2 or Mp3: see FIG. 26) is read and, subsequently, in step S1052, an engine rotational speed Ne detected by the engine rotational sensor 29 and accelerator opening degree θacc detected by the accelerator opening sensor 31 are read.

Then, the program goes to step S1053 in which a target torque τe which constitutes a driving force indication value is determined based on both parameters Ne and θacc by reference to the mode map read in step S1051 with the interpolation calculation.

Next, the program goes to step S1054 in which a target throttle opening θe corresponding to the target torque τe is determined as a final driving force indication value.

Then, the program goes to step S1055 in which a throttle opening θth detected by the throttle opening sensor 32 is read. In step S1056, a feedback control is applied to the throttle actuator 37 which performs an open/close operation of the throttle valve mounted in the electronic throttle control device such that the throttle opening θth is converged to the target throttle opening θe. Then, the routine is finished.

As a result, when the driver manipulates the accelerator pedal 14, the throttle valve is opened or closed in accordance with the mode maps Mp1, Mp2 and Mp3 corresponding to the mode M (M: normal mode m1, save mode m2, power mode m3) selected by the driver, using the accelerator opening degree θacc and the engine rotational speed Ne as parameters. When the mode M is set to the normal mode m1, an output torque is preset approximately linearly with respect to an operation amount of the accelerator pedal (accelerator opening degree θacc) and hence, the normal driving can be performed.

Further, when the mode M is set to the save mode m2, the elevation of the target torque is suppressed and hence, the driver can enjoy the acceleration work by widely using the stroke of the accelerator pedal 14 and, at the same time, it is possible to acquire both of easy drive ability and low fuel consumption in a well-balanced manner. Accordingly, even in case of a vehicle with a 3 litter engine, the smooth driving can be performed while ensuring a sufficient output corresponding to the 2 litter engine and hence, the vehicle can obtain the favorable driving performance in a practical-use region such as towns and the cities.

Further, when the mode M is set to the power mode m3, a high acceleration response is obtained and hence, the vehicle can perform more sporty traveling.

As a result, the driver can enjoy three kinds of acceleration responses which completely differ from each other with one vehicle. Accordingly, the driver can arbitrarily select the preferred driving force characteristic even after purchasing the vehicle and can drive the vehicles corresponding to three vehicles having different characteristics with one vehicle.

Further, in this embodiment, when the temporary changeover switch 11 which is mounted on the steering wheel 9 is manipulated or the select lever 7 is positioned to the R range regardless of ON/OFF state of the mode control change switch 46, the mode M is temporarily changed over. This temporarily changeover control is executed in accordance with a temporarily changeover control routine shown in FIG. 25.

In this routine, first of all, it is determined whether the select lever 7 is positioned to the R range or not based on a signal from the inhibitor switch 42 in step S1071. When it is determined that the select lever 7 is positioned to the R range, the program goes to step S1072, while when the select lever 7 is positioned to a range other than the R range, the program goes to step S1075.

When the program goes to step S1072, the current mode M is referred and the routine is finished except for a state in which the mode M is set to the power mode m3. Further, when the mode M is set to the power mode m3, the program goes to step S1073 to set a reverse flag FR (FR←1) and the program goes to step S1074 to set the mode M to the normal mode m1 (M←mode m1) and the routine is finished.

In this manner, according to this embodiment, when the select lever 7 is moved to the R range in a state that the mode M is set to the power mode m3, the mode M is forcibly changed over to the normal mode m1 and hence, even when the accelerator pedal 14 is depressed slightly at driving the vehicle backward, there is no possibility that the vehicle suddenly travels backward thus acquiring the favorable backward travel performance.

On the other hand, when it is determined that the select lever 7 is positioned to the range other than the R range in step S1071 and the program goes to step S1076, the reverse flag FR is referred. When the reverse flag FR is 1 (FR=1), that is, in the first routine after the select lever 7 is changed over to another range from the R range, the program goes to step S1076 in which the mode M is made to return to the power mode m3 (M←mode m3). Then the program goes to step S1077 in which the reverse flag FR is cleared (FR←0) and the program goes to step S1078.

As a result, in a state that after the mode M is forcibly changed over to the normal mode m1 from the power mode m3 because of the manipulation of the select lever 7 to the R range, the select lever 7 is moved to the D range, for example, the mode M is made to automatically return to the initial power mode m3 and hence, the driver can start the vehicle without feeling a discomfort.

Further, when it is determined that the reverse flag FR is 0 (FR=0) in step S1075, the processing jumps to step S1078.

Then, when the program goes to step S1078 from step S1075 or step S1077, it is determined whether the temporary changeover switch 11 is turned on or not. Then, when it is determined that the temporary changeover switch 11 is not turned on, the routine is finished as it is.

On the other hand, when it is determined that the temporary changeover switch 11 is turned on, the program goes to step S1079 to read the current mode M, and in step S1080, it is determined whether the mode M is set to the power mode m3 or not.

Then, when it is determined that the mode M is set to a mode (normal mode m1 or save mode m2) other than the power mode m3, the program goes to step S1081 in which the mode M at the time the temporary changeover switch 11 is turned on is stored as a previous mode M(n·1) (M(n·1)←M) and the processing advances to step S1082. In step S1082, the current mode M is set to the power mode m3 (M←mode m3) and the routine is finished.

In this manner, according to this embodiment, even when the mode M is set to the normal mode m1 or the save mode m2 using the mode select switch 8 in the condition that the mode control change switch 46 is OFF state, the mode M can be changed over to the power mode m3 by turning on the driver's-side temporary changeover switch 11. As a result, in traveling an ascending slope which requires power, the mode M can be easily changed over to the power mode m3 from the normal mode m1 or the save mode m2 temporarily and hence, the vehicle can acquire the favorable traveling performance. Further, the temporary changeover switch 11 is mounted on the steering wheel 9 and hence, the driver can easily change over the mode M without leaving his/her hand from the steering wheel 9 thus improving the manipulability.

Further, when it is determined that the current mode M is set to the power mode m3 in step S1080, the program is branched to the step S1083 in which the previous mode M(n·1) is read to be the current mode M (M←M(n·1)) and the routine is finished.

As a result, by manipulating the temporary changeover switch 11 again after the mode M is temporarily changed over to the power mode m3, the mode M is made to return to the initial mode M (normal mode m1 or save mode m2).

The invention is not limited to the above-mentioned embodiment. For example, two kinds or four kinds or more of mode maps which differ in driving force characteristics from each other may be set. By setting the mode maps in this manner, the driver can drive the vehicle corresponding to two or four or more vehicles having different driving force characteristics with one vehicle. Further, the driving force characteristic of the mode map may be changed corresponding to liking of the driver.

Further, in this embodiment, the case in which the target torque is set using the plurality of mode maps having the plurality of different driving force characteristics based on the accelerator opening degree and the engine rotational speed is exemplified. However, the invention is not limited to such a case and the target torques of the respective driving force characteristics may be obtained by calculation based on the accelerator opening degree and the engine rotational speed.

Fourth Embodiment

Figure 27:
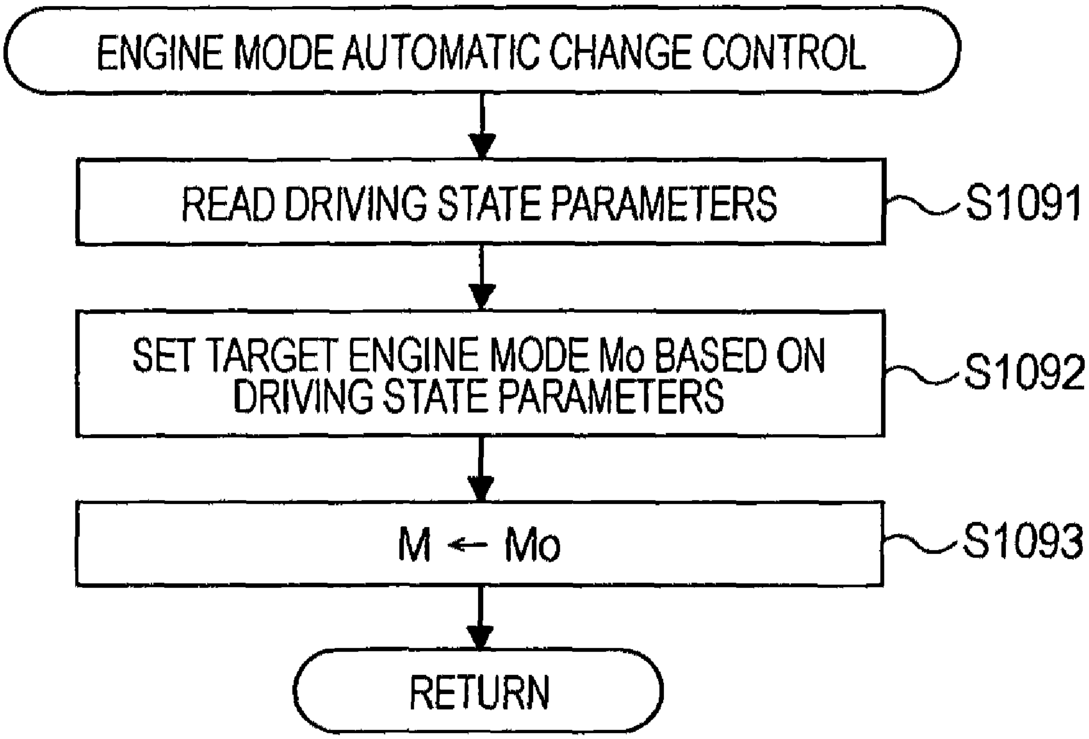
FIG. 27 is a flowchart illustrating an engine-mode automatic change control routine of a fourth embodiment.

FIGS. 27 and 28A to 28C illustrate a fourth embodiment of the present invention. FIG. 27 shows an engine-mode automatic change control routine in which the engine mode M is automatically switched on the basis of driving-state parameters. This routine is used in place of the routine of the flowchart shown in FIG. 22.

More specifically, first, in step S1091, driving-state parameters detected by the driving-state detection means (the vehicle speed sensor 41, the accelerator opening-degree sensor 31, a front-rear acceleration sensor, a wheel speed sensor, etc.) are read. The driving-state parameters may be, for example, the combination of the vehicle speed V and the accelerator opening-degree ACL [%] (see FIG. 28A) which reflect the driver's intention, the combination of an amount of change ΔACL in the accelerator opening-degree ACL per unit time and an accelerator opening speed Sac (see FIG. 28B), or the combination of the vehicle speed V and the front-rear acceleration Vg (see FIG. 28C). The front-rear acceleration Vg is detected on the basis of the output of the front-rear acceleration sensor or the wheel speed.

Figure 28A:
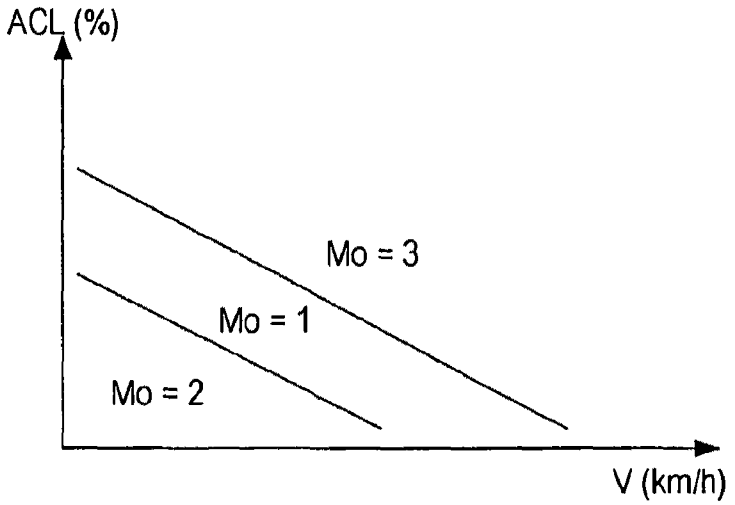
FIG. 28A is a conceptual diagram showing an engine mode area map set by the vehicle speed and the acceleration opening-degree.
Figure 28B:
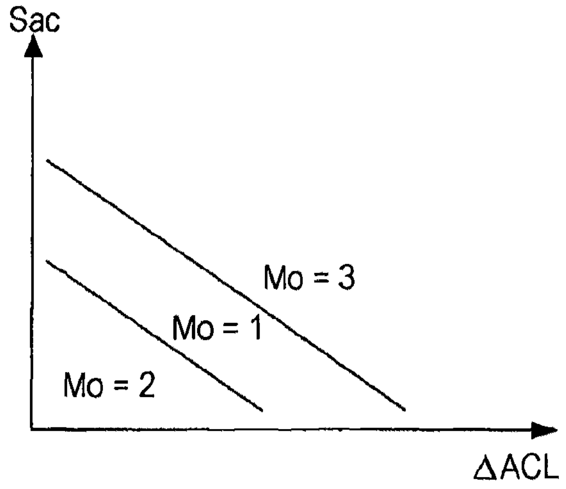
FIG. 28B is a conceptual diagram showing an engine mode area map set by an amount of change in the acceleration opening-degree and the acceleration opening speed.
Figure 28C:
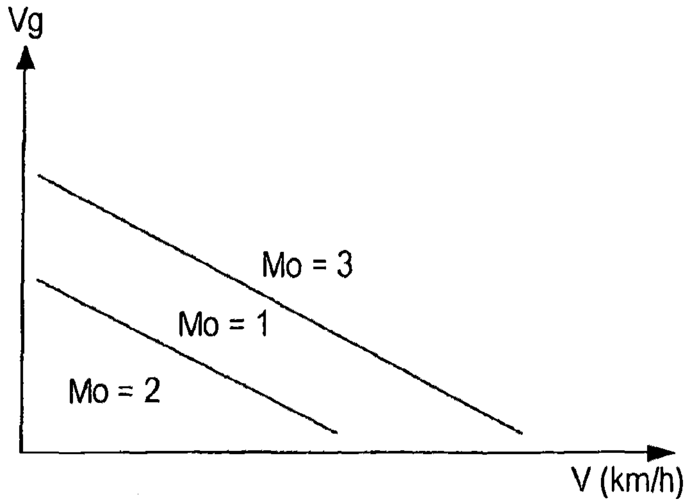
FIG. 28C is a conceptual diagram showing an engine mode area map set by the vehicle speed and the front-rear acceleration.

Next, in step S1092, the target engine mode Mo is set on the basis of the driving-state parameters by referring to the mode area map and performing interpolation calculation. FIGS. 28A to 28C are conceptual diagrams of mode area maps. Referring to the mode area map shown in FIG. 28A, in an area where the accelerator opening-degree ACL and the vehicle speed V are both low, the target engine mode Mo is set to the save mode m2 in which economic running is possible. In an area where at least one of the accelerator opening-degree ACL and the vehicle speed V is high, the target engine mode Mo is set to the power mode m3 because the required driving force is high. In an intermediate area between the above-mentioned areas, the target engine mode Mo is set to the normal mode m1. Similar to FIG. 23, the thresholds that divide the modes from each other are set to have hysteresis so that control hunting, which occurs due to switching of the engine mode in areas near the thresholds, can be prevented.

Referring to the mode area map shown in FIG. 28B, in an area where the amount of change ΔACL in the accelerator opening-degree and the accelerator opening speed Sac are both low, the target engine mode Mo is set to the save mode m2 in which economic running is possible. In an area where at least one of the amount of change ΔACL in the accelerator opening-degree and the accelerator opening speed Sac is high, the target engine mode Mo is set to the power mode m3 because the required driving force is high. In an intermediate area between the above-mentioned areas, the target engine mode Mo is set to the normal mode m1. Also in this case, the thresholds that divide the modes from each other are set to have hysteresis.

Referring to the mode area map shown in FIG. 28C, in an area where the front-rear acceleration Vg and the vehicle speed V are both low, the target engine mode Mo is set to the save mode m2 in which economic running is possible. In an area where at least one of the front-rear acceleration Vg and the vehicle speed V is high, the target engine mode Mo is set to the power mode m3 because the required driving force is high. In an intermediate area between the above-mentioned areas, the target engine mode Mo is set to the normal mode m1. Also in this case, the thresholds that divide the modes from each other are set to have hysteresis.

Then, the program goes to step S1093, where the engine mode M is set to the target engine mode Mo set in step S1092 (M←Mo), and the routine is finished.

According to the present embodiment, the control operation can be facilitated because the target engine mode Mo is switched in accordance with the driving-state parameters. Since the engine mode M is set to the power mode m3 when the accelerator pedal is depressed, the driver does not feel an insufficient torque. In addition, since the engine mode M switches to the save mode m2 when the accelerator pedal is released, the driver does not feel an excess torque. As a result, excellent driving performance can be attained.

Fifth Embodiment

Figure 29:
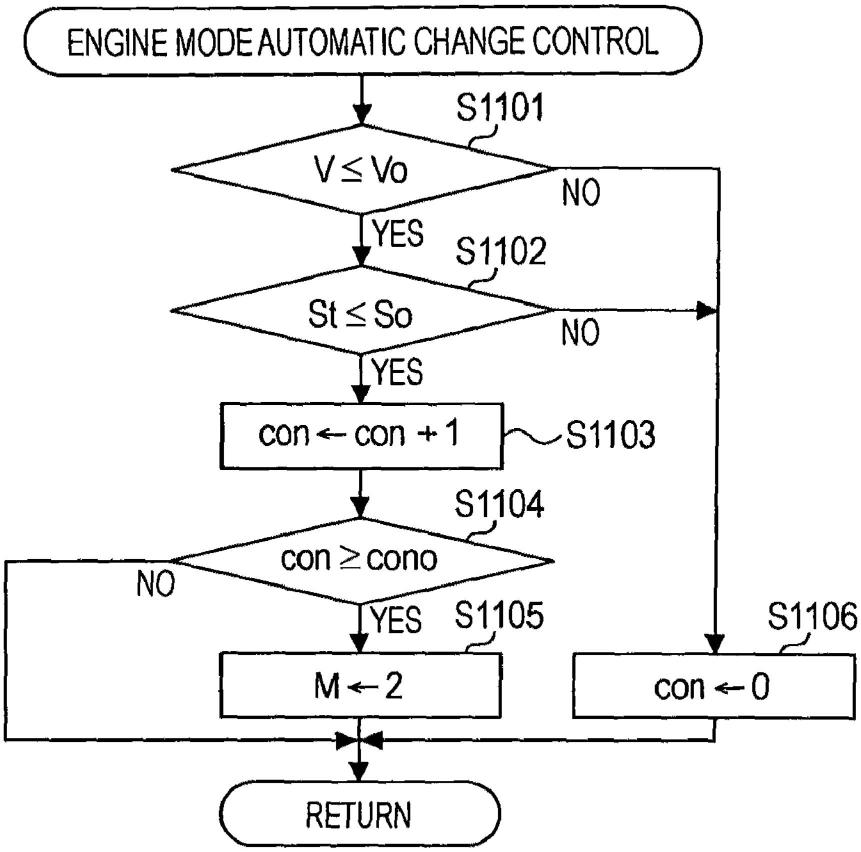
FIG. 29 is a flowchart illustrating an engine-mode automatic change control determination routine of a fifth embodiment.
Figure 30:
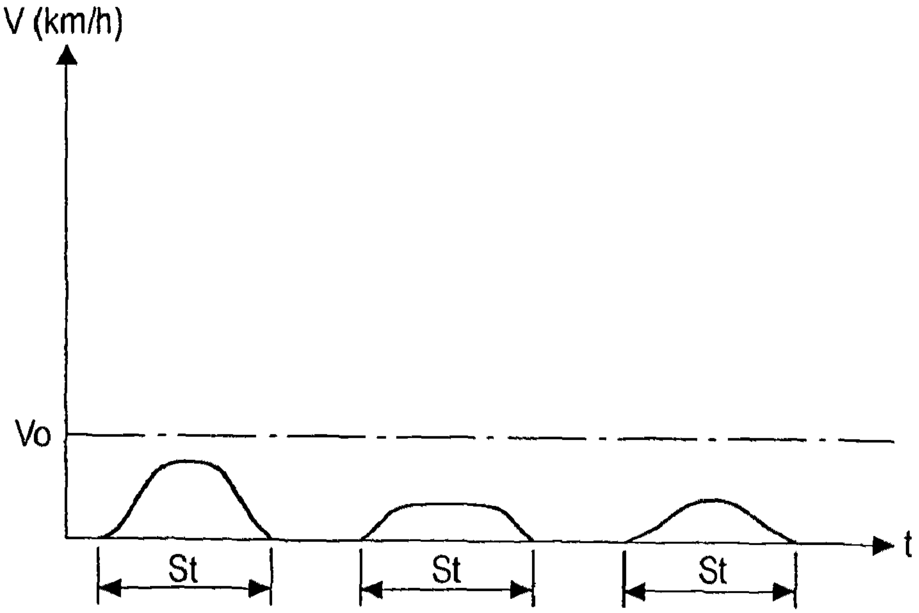
FIG. 30 is a time chart illustrating the state of traffic jam.

FIGS. 29 and 30 illustrate a fifth embodiment of the present invention. FIG. 29 shows an engine-mode automatic change control routine in which the engine mode M is switched to the save mode m2 in the case of a traffic jam. This routine is performed continuously after the flowchart shown in FIG. 22.

First, in step S1101, it is determined whether or not the vehicle speed V is equal to or less than a low-speed determination threshold Vo. If it is determined that the vehicle speed V is low and V≦Vo is satisfied, the program goes to step S1102. If it is determined that V>Vo is satisfied, the program jumps to step S1106.

In step S1102, duration St of the vehicle speed V is compared with a traffic-jam determination threshold So. If the continuous driving time is short and St≦So is satisfied, the program goes to step S1103. If the continuous driving time is long and St>So is satisfied, the program jumps to step S106.

In step S1103, a count value con of a counter is incremented (con←con+1). In step S1104, it is determined whether or not the count value con has reached a traffic-jam determination threshold cono. If con≧cono is satisfied, it is determined that the vehicle is caught in a traffic jam and the program goes to step S1105. If con<cono is satisfied, the routine is finished.

In step S1105, the engine mode M is set to the save mode m2 (M←2), and the routine is finished.

When the program goes to step S1106 from step S1101 or step S1102, the count value con of the counter is cleared (con←0) and the routine is finished.

As a result, the engine mode M is automatically switched to the save mode m2 when the vehicle is caught in a traffic jam and therefore repeatedly stops and starts as shown in FIG. 30. Thus, the driver does not feel an excess torque when the driver operates the accelerator pedal while the vehicle is in a traffic jam, and excellent driving performance can be attained.

In the above embodiments, the throttle actuator 37 for driving the throttle valve mounted to the electronic controlled throttle device is controlled. However, other components may also be controlled instead of the throttle actuator 37. For example, in the case of a diesel engine, an injector driving apparatus may be controlled, and an amount of fuel injected by the injector driving apparatus may be set on the basis of the target torque τe. Alternatively, in the case of an engine in which an intake valve is opened and closed by an electromagnetic valve-operating mechanism, the electromagnetic valve mechanism may be controlled, and the opening-degree of the intake valve which is driven by the electromagnetic valve mechanism may be set on the basis of the target torque τe.

Vehicles to which the present invention can be applied is not limited to gasoline engine vehicles and diesel engine vehicles, and the present invention may be applied to other various types of vehicles including natural gas vehicles, hybrid vehicles, electric automobiles, etc. For electric automobiles, inverter output voltages may be set instead of the above-described engine modes.

What is claimed is:

1. An engine control apparatus, comprising:

driving-state detection means for detecting a driving state;

storage means for storing mode maps for respective engine control modes, the engine control modes including at least a power mode comprising engine output characteristics that prioritize power and a save mode comprising engine output characteristics with which power is suppressed, each mode map comprising lattice axes of an accelerator opening-degree and the driving state and setting an engine output command value for a corresponding engine control mode of the engine control modes;

selecting means for selecting one of the engine control modes; and engine-output-command-value determining means for determining the engine output command value by referring to the mode map corresponding to the engine control mode selected by the selecting means, wherein the selecting means automatically selects one of the engine control modes on a basis of the driving state detected by the driving-state detection means, and wherein the driving state comprises an accelerator opening-degree change rate.

2. The engine control apparatus according to claim 1, wherein the selecting means automatically selects one of the engine control modes on a basis of a vehicle speed and a weighted average of sums of parameters corresponding to a plurality of events based on the driving state detected by the driving-state detection means.

3. An engine control apparatus, comprising:

driving-state detection means for detecting a driving state;

storage means for storing mode maps for respective engine control modes, the engine control modes including at least a normal mode comprising engine output characteristics suitable for normal driving and a power mode comprising engine output characteristics that prioritize power, each mode map comprising lattice axes of an accelerator opening-degree and the driving state and setting an engine output command value for a corresponding engine control mode of the engine control modes;

selecting means for selecting one of the engine control modes; and engine-output-command-value determining means for determining the engine output command value by referring to the mode map corresponding to the engine control mode selected by the selecting means, wherein the selecting means automatically selects one of the engine control modes on a basis of the driving state detected by the driving-state detection means, and wherein the driving state comprises an accelerator opening-degree change rate.

4. The engine control apparatus according to claim 3, wherein the selecting means automatically selects one of the engine control modes on a basis of a vehicle speed and a weighted average of sums of parameters corresponding to a plurality of events based on the driving state detected by the driving-state detection means.

5. An engine control apparatus, comprising:

driving-state detection means for detecting a driving state;

storage means for storing mode maps for respective engine control modes, the engine control modes including at least a normal mode comprising engine output characteristics suitable for normal driving and a save mode comprising engine output characteristics with which power is suppressed, each mode map comprising lattice axes of an accelerator opening-degree and the driving state and setting an engine output command value for a corresponding engine control mode of the engine control modes;

selecting means for selecting one of the engine control modes; and engine-output-command-value determining means for determining the engine output command value by referring to the mode map corresponding to the engine control mode selected by the selecting means, wherein the selecting means automatically selects one of the engine control modes on a basis of the driving state detected by the driving-state detection means, and wherein the driving state comprises an accelerator opening-degree change rate.

6. The engine control apparatus according to claim 5, wherein the selecting means automatically selects one of the engine control modes on a basis of a vehicle speed and a weighted average of sums of parameters corresponding to a plurality of events based on the driving state detected by the driving-state detection means.

7. An engine control apparatus, comprising:

driving-state detection means for detecting a driving state;

storage means for storing mode maps for respective engine control modes, the engine control modes including at least a normal mode comprising engine output characteristics suitable for normal driving, a save mode comprising engine output characteristics with which power is suppressed, and a power mode comprising engine output characteristics that prioritize power, each mode map comprising lattice axes of an accelerator opening-degree and the driving state and setting an engine output command value for a corresponding engine control mode of the engine control modes;

selecting means for selecting one of the engine control modes; and engine-output-command-value determining means for determining the engine output command value by referring to the mode map corresponding to the engine control mode selected by the selecting means, wherein the selecting means automatically selects one of the engine control modes on a basis of the driving state detected by the driving-state detection means, and wherein the driving state comprises an accelerator opening-degree change rate.

8. The engine control apparatus according to claim 7, wherein the selecting means automatically selects one of the engine control modes on a basis of a vehicle speed and a weighted average of sums of parameters corresponding to a plurality of events based on the driving state detected by the driving-state detection means.

9. The engine control apparatus according to claim 1, wherein the accelerator opening-degree comprises an amount of actuation of an accelerator pedal.

10. The engine control apparatus according to claim 1, wherein the engine output command value comprises a target torque value.

11. The engine control apparatus according to claim 1, wherein the engine output command value comprises a target throttle opening-degree value.

12. The engine control apparatus according to claim 1, wherein the engine output command value determining means adjusts the engine output command value if the accelerator opening-degree and a vehicle speed satisfy a predetermined condition, wherein the engine output command value (CV) is adjusted by a target command value of the selected engine control mode (TCSM) modified by a ratio (R) and a target command value of the non-selected engine control mode (TCNSM) which satisfies the equation:

$$CV=TCSM\times R+TCNSM\times(1-R).$$

13. The engine control apparatus according to claim 1, wherein the driving state comprises a vehicle speed and a front or rear vehicle acceleration.

14. The engine control apparatus according to claim 1, wherein the driving state comprises at least one of a coefficient of friction of a road, and an outside temperature.

15. The engine control apparatus according to claim 2, wherein the plurality of events comprises driving conditions and a driving style of a driver.

16. The engine control apparatus according to claim 2, wherein the weighted average of the sums of parameters is calculated from when an ignition switch is turned on to when the ignition switch is turned off.

17. The engine control apparatus according to claim 2, wherein the weighted average of the sums of parameters is reset when a predetermined event occurs.

18. The engine control apparatus according to claim 2, wherein the plurality of events comprises at least one of a degree of ascent of a road, a degree of descent of the road, a degree of usage of high engine speeds, a degree of winding of the road, a degree of acceleration, and a degree of deceleration.

* * * * *